(12) United States Patent
Ideshio et al.

(10) Patent No.: US 8,784,245 B2
(45) Date of Patent: Jul. 22, 2014

(54) VEHICLE DRIVE SYSTEM

(75) Inventors: Yukihiko Ideshio, Nissin (JP); Shigeru Okuwaki, Gotemba (JP); Hiroyuki Shibata, Susono (JP); Tomohito Ono, Susono (JP); Seiji Masunaga, Susono (JP); Makoto Funahashi, Gotemba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 341 days.

(21) Appl. No.: 12/995,904

(22) PCT Filed: Jun. 2, 2009

(86) PCT No.: PCT/IB2009/005812
§ 371 (c)(1),
(2), (4) Date: Dec. 2, 2010

(87) PCT Pub. No.: WO2009/147501
PCT Pub. Date: Dec. 10, 2009

(65) Prior Publication Data
US 2011/0111910 A1 May 12, 2011

(30) Foreign Application Priority Data
Jun. 3, 2008 (JP) .................. 2008-145669

(51) Int. Cl.
*F16H 3/72* (2006.01)
*F16H 37/06* (2006.01)

(52) U.S. Cl.
USPC .............................................. 475/5; 903/910

(58) Field of Classification Search
USPC ...................................... 475/3, 5, 6
See application file for complete search history.

(56) References Cited

U.S. PATENT DOCUMENTS

| 6,634,986 | B2 | 10/2003 | Kima |
| 6,645,105 | B2 * | 11/2003 | Kima ............................. 475/5 |
| 6,719,655 | B2 | 4/2004 | Kramer |
| 6,817,327 | B2 * | 11/2004 | Ehrlinger et al. ........ 123/179.22 |
| 7,128,677 | B2 | 10/2006 | Supina et al. |
| 7,314,421 | B2 | 1/2008 | Kim |
| 7,314,424 | B2 | 1/2008 | Supina et al. |
| 7,575,529 | B2 | 8/2009 | Holmes |

(Continued)

FOREIGN PATENT DOCUMENTS

| DE | 102 25 249 A1 | 12/2003 |
| EP | 1 209 017 A2 | 5/2002 |

(Continued)

OTHER PUBLICATIONS

International Search Report for corresponding International Patent Application No. PCT/IB2009/005812 mailed Mar. 29, 2010.

(Continued)

*Primary Examiner* — Justin Holmes
(74) *Attorney, Agent, or Firm* — Sughrue Mion, PLLC

(57) ABSTRACT

A drive system includes a transmission mechanism that establishes a plurality of gear positions comprising a first-speed through sixth-speed gear positions and a reverse-drive gear position, by switching among change gear trains and coupling a first driveshaft to an output member, and also includes a lock clutch that switches a power distribution mechanism between a locked state in which a ring gear and a carrier are coupled to each other and are inhibited from rotating in a differential fashion, and a released state in which the inhibition of the differential rotation is cancelled.

13 Claims, 17 Drawing Sheets

(56) References Cited

U.S. PATENT DOCUMENTS

| | | |
|---|---|---|
| 8,075,436 B2 | 12/2011 | Bachmann |
| 2003/0045389 A1 | 3/2003 | Kima |
| 2007/0131046 A1 | 6/2007 | Borgerson |
| 2007/0254761 A1 | 11/2007 | Kim |
| 2008/0009379 A1 | 1/2008 | Steinwender |
| 2008/0041489 A1 | 2/2008 | Tatsuno |
| 2009/0011887 A1* | 1/2009 | Komada et al. ............ 475/5 |
| 2009/0170649 A1* | 7/2009 | Murakami et al. ......... 475/5 |
| 2010/0173746 A1* | 7/2010 | Ideshio et al. ............ 477/36 |

FOREIGN PATENT DOCUMENTS

| | | |
|---|---|---|
| JP | 05-319110 A | 12/1993 |
| JP | 2000-142139 A | 5/2000 |
| JP | 2001-200899 A | 7/2001 |
| JP | 2002-204504 A | 7/2002 |
| JP | 2003-072403 A | 3/2003 |
| JP | 2004-161053 A | 6/2004 |
| JP | 2004-263708 A | 9/2004 |
| JP | 2004-293795 A | 10/2004 |
| JP | 2005-155891 A | 6/2005 |
| JP | 2005331063 A | 12/2005 |
| JP | 2006-038136 A | 2/2006 |
| JP | 2006-044521 A | 2/2006 |
| JP | 2007-519867 A | 7/2007 |
| WO | 2005/065976 A1 | 7/2005 |
| WO | 2005/073005 A1 | 8/2005 |
| WO | 2007/110721 A1 | 10/2007 |

OTHER PUBLICATIONS

Japanese Office Action for corresponding Japanese Patent Application No. 2008-145669 drafted Nov. 5, 2009.

Written Opinion for corresponding International Patent Application No. PCT/IB2009/005812 mailed Mar. 29, 2010.

U.S. non-final Office Action for related U.S. Appl. No. 12/664,709 issued on Dec. 7, 2012.

U.S. Office Action dated Jun. 7, 2013 issued in corresponding U.S. Appl. No. 12/664,709.

* cited by examiner

FIG.2

| GEAR | DRIVE MODE | S1 | S2 | S3 | S4 | SL | SE |
|---|---|---|---|---|---|---|---|
| 1st | EV | P1 | × | × | × | ○ | × |
| | Eng | P1 | × | × | × | - | ○ |
| | Eng + MG | P1 | × | × | × | ○ | ○ |
| 1st – 2nd | | P1 | P2 | × | × | × | ○ |
| 2nd | EV | × | P2 | × | × | ○ | × |
| | Eng | × | P2 | × | × | ○ | ○ |
| | CVT | × | P2 | × | × | × | ○ |
| | Eng + MG | × | P2 | × | × | ○ | ○ |
| 2nd – 3rd | | P3 | P2 | × | × | × | ○ |
| 3rd | EV | P3 | × | × | × | ○ | × |
| | Eng | P3 | × | × | × | - | ○ |
| | Eng + MG | P3 | × | × | × | ○ | ○ |
| 3rd – 4th | | P3 | P4 | × | × | × | ○ |
| 4th | EV | × | P4 | × | × | ○ | × |
| | Eng | × | P4 | × | × | ○ | ○ |
| | CVT | × | P4 | × | × | × | ○ |
| | Eng + MG | × | P4 | × | × | ○ | ○ |
| 4th – 5th | | × | P4 | P5 | × | × | ○ |
| 5th | EV | × | × | P5 | × | ○ | × |
| | Eng | × | × | P5 | × | - | ○ |
| | Eng + MG | × | × | P5 | × | ○ | ○ |
| 5th – 6th | | × | × | P5 | P6 | × | ○ |
| 6th | EV | × | × | × | P6 | ○ | × |
| | Eng | × | × | × | P6 | ○ | ○ |
| | CVT | × | × | × | P6 | × | ○ |
| | Eng + MG | × | × | × | P6 | ○ | ○ |
| REV | EV | × | × | × | PR | ○ | × |
| | Eng | × | × | × | PR | - | ○ |
| | Eng + MG | × | × | × | PR | ○ | ○ |

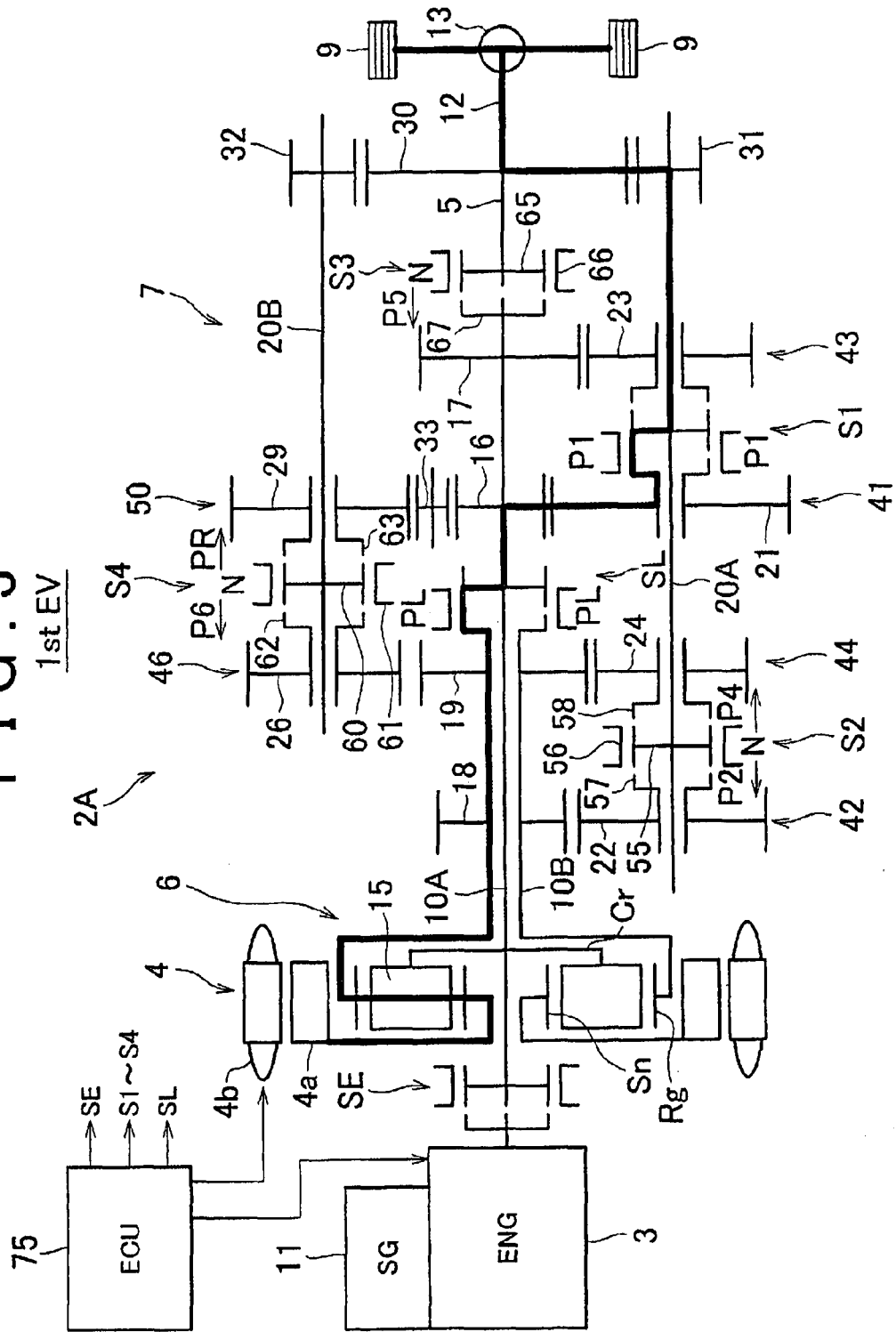

1st EV

1st Eng

2nd CVT

2nd CVT

<Eng + MG MODE 1st → 2nd FIRST CONDITION>

<Eng + MG MODE 1st → 2nd SECOND CONDITION>

<Eng + MG MODE 1st → 2nd THIRD CONDITION>

<Eng + MG MODE 1st → 2nd FOURTH CONDITION>

<Eng + MG MODE 1st → 2nd FIFTH CONDITION>

6th CVT

FIG. 16

| GEAR | DRIVE MODE | T1 | T2 | T3 | T4 | T5 | SL | SE |
|---|---|---|---|---|---|---|---|---|
| 1st | EV | P1 | × | × | × | × | ○ | × |
| | Eng | P1 | × | × | × | × | - | ○ |
| | Eng + MG | P1 | × | × | × | × | ○ | ○ |
| 1st − 2nd | | P1 | P2 | × | × | × | × | ○ |
| 2nd | EV | × | P2 | × | × | × | ○ | × |
| | Eng | × | P2 | × | × | × | ○ | ○ |
| | CVT | × | P2 | × | × | × | × | ○ |
| | Eng + MG | × | P2 | × | × | × | ○ | ○ |
| 2nd − 3rd | | P3 | P2 | × | × | × | × | ○ |
| 3rd | EV | P3 | × | × | × | × | ○ | × |
| | Eng | P3 | × | × | × | × | - | ○ |
| | Eng + MG | P3 | × | × | × | × | ○ | ○ |
| 3rd − 4th | | P3 | P4 | × | × | × | × | ○ |
| 4th | EV | × | P4 | × | × | × | ○ | × |
| | Eng | × | P4 | × | × | × | ○ | ○ |
| | CVT | × | P4 | × | × | × | × | ○ |
| | Eng + MG | × | P4 | × | × | × | ○ | ○ |
| 4th − 5th | | × | P4 | P5 | × | × | × | ○ |
| 5th | EV | × | × | P5 | × | × | ○ | × |
| | Eng | × | × | P5 | × | × | - | ○ |
| | Eng + MG | × | × | P5 | × | × | ○ | ○ |
| 5th − 6th | | × | × | P5 | P6 | × | × | ○ |
| 6th | EV | × | × | × | P6 | × | ○ | × |
| | Eng | × | × | × | P6 | × | ○ | ○ |
| | CVT | × | × | × | P6 | × | × | ○ |
| | Eng + MG | × | × | × | P6 | × | ○ | ○ |
| 6th − 7th | | × | × | × | P6 | P7 | × | ○ |
| 7th | EV | × | × | × | × | P7 | ○ | × |
| | Eng | × | × | × | × | P7 | - | ○ |
| | Eng + MG | × | × | × | × | P7 | ○ | ○ |
| REV | EV | × | × | PR | × | × | ○ | × |
| | Eng | × | × | PR | × | × | - | ○ |
| | Eng + MG | × | × | PR | × | × | ○ | ○ |

FIG. 18

| GEAR | DRIVE MODE | U1 | U2 | U3 | U4 | U5 | SL | SE |
|---|---|---|---|---|---|---|---|---|
| 1st | EV | P1 | × | × | × | × | O | × |
|  | Eng | P1 | × | × | × | × | − | O |
|  | Eng + MG | P1 | × | × | × | × | O | O |
| 1st − 2nd |  | P1 | P2 | × | × | × | × | O |
| 2nd | EV | × | P2 | × | × | × | O | × |
|  | Eng | × | P2 | × | × | × | O | O |
|  | CVT | × | P2 | × | × | × | × | O |
|  | Eng + MG | × | P2 | × | × | × | O | O |
| 2nd − 3rd |  | P3 | P2 | × | × | × | × | O |
| 3rd | EV | P3 | × | × | × | × | O | × |
|  | Eng | P3 | × | × | × | × | − | O |
|  | Eng + MG | P3 | × | × | × | × | O | O |
| 3rd − 4th |  | P3 | × | P4 | × | × | × | O |
| 4th | EV | × | × | P4 | × | × | O | × |
|  | Eng | × | × | P4 | × | × | O | O |
|  | CVT | × | × | P4 | × | × | × | O |
|  | Eng + MG | × | × | P4 | × | × | O | O |
| 4th − 5th |  | × | × | P4 | P5 | × | × | O |
| 5th | EV | × | × | × | P5 | × | O | × |
|  | Eng | × | × | × | P5 | × | − | O |
|  | Eng + MG | × | × | × | P5 | × | O | O |
| 5th − 6th |  | × | P6 | × | P5 | × | × | O |
| 6th | EV | × | P6 | × | × | × | O | × |
|  | Eng | × | P6 | × | × | × | O | O |
|  | CVT | × | P6 | × | × | × | × | O |
|  | Eng + MG | × | P6 | × | × | × | O | O |
| 6th − 7th |  | × | P6 | × | × | P7 | × | O |
| 7th | EV | × | × | × | × | P7 | O | × |
|  | Eng | × | × | × | × | P7 | − | O |
|  | Eng + MG | × | × | × | × | P7 | O | O |
| 7th − 8th |  | × | × | P8 | × | P7 | × | O |
| 8th | EV | × | × | P8 | × | × | O | × |
|  | Eng | × | × | P8 | × | × | O | O |
|  | CVT | × | × | P8 | × | × | × | O |
|  | Eng + MG | × | × | P8 | × | × | O | O |
| REV | EV | × | × | PR | × | × | O | × |
|  | Eng | × | × | PR | × | × | − | O |
|  | Eng + MG | × | × | PR | × | × | O | O |

VEHICLE DRIVE SYSTEM

The disclosure of Japanese Patent Application No. 2008-145669 filed on Jun. 3, 2008, including the specification, drawings and abstract is incorporated herein by reference in its entirety.

BACKGROUND OF THE INVENTION

1. Field of the Invention

The invention relates to a vehicle drive system in which an internal combustion engine and an electric motor are provided as driving sources.

2. Description of the Related Art

In a conventional vehicle drive system (as disclosed in Japanese Patent Application Publication No. 2002-204504 (JP-A-2002-204504)), a twin-clutch type transmission using a plurality of gears is coupled to an internal combustion engine, and an electric motor is disposed between two clutch shafts of the transmission, such that a rotor shaft of the motor extends in a direction perpendicular to the clutch shafts. One of the clutch shafts is connected to the rotor shaft of the motor via a pair of bevel gears, and the other clutch shaft is connected to a case of the motor via another pair of bevel gears. In operation, a difference between the rotational speeds of the two clutch shafts is utilized to drive the motor, thereby to generate electric power. Other prior art documents relevant to the invention include, for example, Japanese Patent Application Publication No. 2004-293795 (JP-A-2004-293795).

In the drive system of JP-A-2002-204504, the internal combustion engine and the two clutch shafts are connected to each other via two or more coupling gears interposed therebetween. Therefore, the drive system inevitably suffers from losses due to engagement of the gears during transmission of power of the engine. Also, it is difficult to reduce the size of the drive system since the electric motor is disposed between the two clutch shafts. Furthermore, the rotor shaft of the motor and each of the clutch shafts, which are perpendicular to each other, are connected to each other via bevel gears, and this arrangement makes the drive system complicated in construction.

SUMMARY OF THE INVENTION

The present invention provides a drive system operable to place a transmission mechanism in a direct-drive gear position by connecting an internal combustion engine with an output member without involving any change gear train therebetween, thereby to reduce losses due to engagement of gears.

According to a first aspect of the invention, there is provided a drive system of a vehicle, which includes: an internal combustion engine, an electric motor, an output member that delivers power to driving wheels of the vehicle, a differential mechanism that includes a first element, a second element and a third element capable of differential rotation relative to each other, the internal combustion engine being coupled to the first element, the electric motor being connected to the second element, a transmission mechanism that establishes a plurality of gear positions that are set stepwise in decreasing order of a gear ratio over a range from the differential mechanism to the output member, by switching among change gear trains interposed between the first element or the third element of the differential mechanism and the output member for transmitting power from the first element or the third element to the output member, and coupling the first element to the output member without involving any of the change gear trains, and a differential lock mechanism that switches the differential mechanism between a locked state in which selected two of the first element, the second element and the third element of the differential mechanism are coupled to each other so as to be inhibited from differential rotation, and a released state in which the inhibition of the differential rotation is cancelled.

According to the drive system as described above, the differential lock mechanism switches the differential mechanism between the locked state and the released state while the operation of the electric motor is being controlled. With this arrangement, during shifting (change of gear positions) of the transmission mechanism through switching from a change gear train interposed between the first element and the output member to a change gear train interposed between the third element and the output member, for example, these change gear trains can be easily brought into synchronization. Therefore, the gear position can be changed with reduced shift shock. In addition to the gear positions established using change gear trains, the transmission mechanism is operable to establish a direct-drive gear position in which the first element to which the engine is coupled is coupled directly to the output member, with no change gear train interposed therebetween. This arrangement leads to reduction of losses due to engagement of gears, and improvement of the fuel economy or efficiency.

In the drive system as described above, the gear positions of the transmission mechanism may include a direct-drive gear position that is established by coupling the first element to the output member without involving any of the change gear trains, and an overdrive gear position that has a smaller gear ratio than that of the direct-drive gear position, and a shift control device may be further provided for controlling the transmission mechanism so as to shift the transmission mechanism from the overdrive gear position to the direct-drive gear position when the vehicle speed becomes equal to or higher than a specified value while the overdrive gear position is established.

For example, when the vehicle speed is in a high-vehicle-speed range equal to or higher than 160 km/h, the engine optimum operating line is located in a high-engine-speed region, and therefore the optimum gear ratio is slightly larger (low-gear side) than the gear ratio of the overdrive gear position suitable for vehicle speeds around 120 km/h. According to the drive system as described above, when the vehicle speed becomes equal to or higher than the specified value while the overdrive gear position is established, the transmission mechanism is shifted into the direct-drive gear position having the larger gear ratio than the overdrive gear position. Namely, the transmission mechanism is downshifted from the overdrive gear position to the direct-drive gear position. As a result, the vehicle is driven at a gear ratio or speed ratio suitable for the high-vehicle-speed range equal to or higher than the specified value, thus assuring improved fuel economy. Also, the gear position into which the transmission mechanism is shifted in the high-vehicle-speed range is the direct-drive gear position involving no change gear train; therefore, losses due to engagement of gears can be reduced. Since the losses due to engagement of gears increase in proportion to the torque, the greatest advantage can be provided by selecting the direct-drive gear position in the high-vehicle-speed range.

In the drive system as described above, the transmission mechanism may include a first driveshaft that rotates with the first element, a hollow second driveshaft that is disposed coaxially around the first driveshaft and rotates with the third element, and a countershaft that is disposed in parallel with the first driveshaft and the second driveshaft, and is provided with a counter gear for transmitting power to the output member, and one of the change gear trains that provides one of the gear positions having the largest gear ratio may be provided between the first driveshaft and the countershaft.

Where the distance between the driveshaft and the countershaft is fixed, the gear ratio of a certain change gear train can be increased with reduction in the gear radius of a drive gear that constitutes the change gear train. In the drive system as described above, the drive gear of the change gear train having the largest gear ratio is mounted on the first driveshaft as the inner one of the coaxially assembled driveshafts; therefore, the gear radius can be reduced as compared with the case where the drive gear is mounted on the second driveshaft as the outer shaft. Thus, the distance between the driveshaft and the countershaft can be reduced as compared with the case where the change gear train is provided between the outer second driveshaft and the countershaft so as to provide a desired gear ratio. Consequently, the size of the drive system, in particular, the radial dimension of the drive system, can be reduced.

In the drive system as described above, the transmission mechanism may include a first driveshaft that rotates with the first element, a hollow second driveshaft that is disposed coaxially around the first driveshaft and rotates with the third element, countershafts that are disposed in parallel with the first driveshaft and is provided with counter gears for transmitting power to the output member, and clutches that are disposed radially outwardly of the second driveshaft and selectively couples the change gear trains that provide the above-indicated plurality of gear positions, to the countershafts, and the differential lock mechanism may place the differential mechanism in the locked state by coupling the first driveshaft and the second driveshaft to each other, and may be disposed between the first driveshaft and one of the clutches.

According to the drive system as described above, the differential lock mechanism and the clutch are positioned so as to overlap each other in the axial direction. Therefore, the dimension of the drive system as measured in the axial direction is prevented from increasing due to the addition of the differential lock mechanism.

In the drive system as described above, the electric motor may include a stator, and a rotor that is disposed coaxially with the stator and has a space formed radially inside thereof, and the differential mechanism may be placed in the space formed radially inside the rotor, while the differential lock mechanism may be located at a position remote from the differential mechanism in an axial direction.

In this case, since the differential mechanism is placed in the space formed radially inside the rotor, the differential mechanism and the motor are positioned so as to overlap each other in the axial direction. If the differential lock mechanism were located in the vicinity of the differential mechanism, the arrangement around the motor would be complicated. In this case, it would be difficult to position the motor and the differential mechanism to overlap each other, and the motor and/or the differential mechanism would need to be displaced in the axial direction. Where the drive system is employed in a FR vehicle in which the axial direction of the system coincides with the running direction of the vehicle, it is advantageous to install the electric motor as closest to the front of the vehicle as possible, in view of the shape of the floor tunnel whose interior space is narrowed toward the rear of the vehicle. This is because the torque produced by the motor increases in proportion to the second to third power of the radius of the motor. If the radius of the motor is reduced, the dimension of the motor as measured in the axial direction must be increased so as to provide the same torque as that provided when the motor radius is not reduced. When the drive system as described above, in which the differential lock mechanism is located remote from the differential mechanism, is employed in the FR vehicle, the electric motor can be placed in a front part of the vehicle. Accordingly, the radius of the motor may be increased under reduced restrictions, and the axial dimension of the motor may be reduced.

In the drive system as described above, the transmission mechanism may include a driveshaft to which power is transmitted from the differential mechanism, and first countershaft and second countershaft that are disposed in parallel with the driveshaft and transmit power of the driveshaft to the output member, and a first change gear train provided between the driveshaft and the second countershaft for establishing a gear position having the smallest gear ratio, and a second change gear train that is provided between the driveshaft and the first countershaft for establishing a gear position having a gear ratio that is larger by two steps than that of the first change gear train may be aligned with each other in a direction perpendicular to the axial direction of the driveshaft.

In the drive system as described above, the first change gear train and the second change gear train are positioned so as to overlap each other in the axial direction. Therefore, the dimension of the drive system as measured in the axial direction can be reduced. Also, the first gear train that provides the gear position having the smallest gear ratio and the second gear train that provides the gear position having a gear ratio that is larger by two steps than the smallest gear ratio are aligned with each other in radial directions (i.e. in a direction perpendicular to the axial direction of the driveshaft); therefore, a difference in the gear ratio between the aligned gear trains may be smaller than that in the case where gear trains that provide other gear positions are aligned with each other in radial directions. Consequently, the distance between the first countershaft and the second countershaft can be reduced.

In the drive system as described above, the transmission mechanism may include a driveshaft to which power is transmitted from the differential mechanism, and a countershaft that is disposed in parallel with the driveshaft and transmit power of the driveshaft to the output member, and a change gear train as one of the change gear trains which is disposed between the driveshaft and the countershaft and provides a gear position having the largest gear ratio may be located at a position remotest from the internal combustion engine.

The torque applied to the change gear train that provides a gear position having the largest gear ratio is larger than those applied to the other gear trains. In the drive system as described above, the change gear train that provides the gear position having the largest gear ratio is located farther apart from the engine than the other gear trains, and the change gear train having the largest gear ratio is supported at a position close to one end of the driveshaft. Accordingly, deflection of the driveshaft can be suppressed, as compared with the case where the change gear train having the largest gear ratio is supported at a position close to the middle of the driveshaft.

As explained above, according to the present invention, the transmission mechanism establishes the direct-drive gear position by coupling the first element to which the engine is coupled, directly to the output member, without involving any change gear train, in addition to the gear positions involving the respective change gear trains; therefore, losses due to engagement of gears can be reduced.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is a view showing a clutch engagement table indicating correspondences between the operating patterns of the drive system and the operating state of each clutch;

FIG. 3 is a view showing a power transmission path established in a first-gear EV mode in the first embodiment;

FIG. 16 is a view showing a clutch engagement table of the drive system shown in FIG. 15;

FIG. 18 is a view showing a clutch engagement table of the drive system shown in FIG. 17.

DETAILED DESCRIPTION OF EMBODIMENTS

Figure 1:
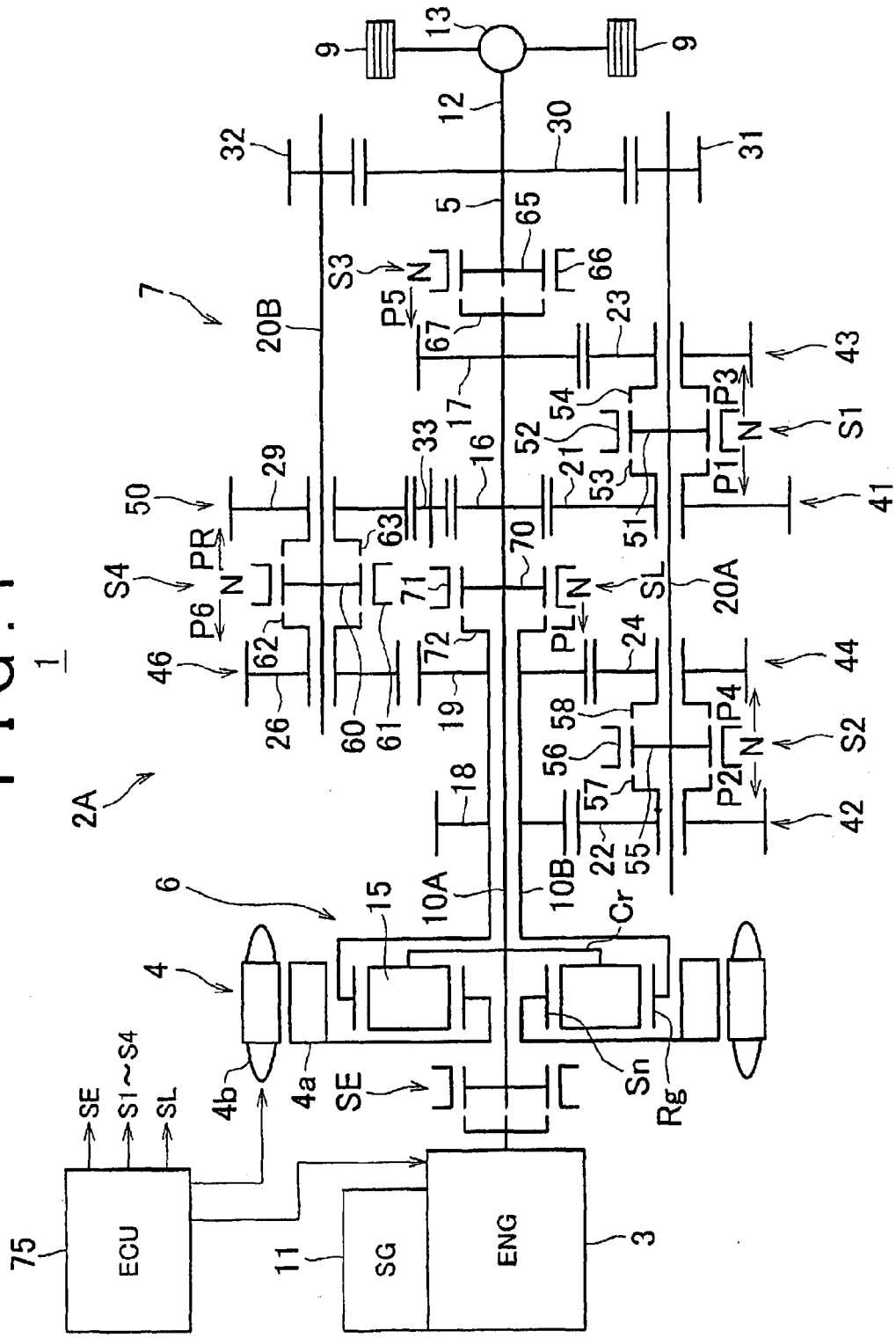
FIG. 1 is a view schematically showing a vehicle in which a drive system according to a first embodiment of the invention is employed.

FIG. 1 schematically illustrates a vehicle in which a drive system according to a first embodiment of the invention is employed. As shown in FIG. 1, the vehicle 1 is a so-called hybrid vehicle having a FR (front-engine rear-drive) type layout. The vehicle 1 is provided with a drive system 2A for running the vehicle. The drive system 2A includes an internal combustion engine 3, a motor-generator (MG) 4 as an electric motor, an output shaft 5 as an output member that delivers power to driving wheels 9 of the vehicle 1, a power distribution mechanism 6 as a differential mechanism to which the engine 3 and the MG4 are coupled, and a transmission mechanism 7 that changes the speed of the output of the power distribution mechanism 6 and transmits the resulting power output to the output shaft 5. The rotation of the output shaft 5 is transmitted to the left and right driving wheels 9, respectively, via a propeller shaft 12 and a differential gear 13. The propeller shaft 12 is coupled to the output shaft 5 and the differential gear 13, respectively, via universal joints (not shown) provided at opposite ends of the propeller shaft 12.

The internal combustion engine 3 is in the form of a spark ignition type, multi-cylinder engine. The engine 3 is connected to a first driveshaft 10A via an engine clutch SE that allows or inhibits power transmission therebetween. The engine clutch SE is in the form of a conventional dog clutch, and is operable to switch between an engaged state in which power is transmitted from the engine 3 to the first driveshaft 10A, and a released state in which the power transmission is cut off. The first driveshaft 10A extends through the MG 4 and the power distribution mechanism 6, and is disposed on the same axis as the output shaft 5. A hollow second driveshaft 10B is disposed around the first driveshaft 10A, coaxially with the first driveshaft 10A. The engine 3 is provided with a starter generator (SG) 11 operable to start the engine 3, and generate electric power using power of the engine 3 after it is started. The electric power generated by the SG 11 is consumed at various parts of the vehicle 1, and is also stored in a battery (not shown) provided as a power supply of the MG 4.

The MG 4 is arranged to function as an electric motor and also function as a generator. The battery is electrically connected to the MG4 via an inverter (not shown), and the inverter is controlled so as to set output torque or regenerative torque of the MG 4 appropriately. The MG 4 includes a rotor 4a that is rotatably provided coaxially with the first driveshaft 10A, and a stator 4b located radially outwardly of the rotor 4a. The stator 4b is fixed to a stationary element, such as a casing (not shown), so as not to rotate. The power distribution mechanism 6 is placed in a space formed radially inside the rotor 4a. Namely, the MG 4 and the power distribution mechanism 6 are positioned so as to overlap each other as viewed in the direction of the axis of the first driveshaft 10A.

The power distribution mechanism 6 is in the form of a planetary gear set. More specifically, the power distribution mechanism 6 includes a sun gear Sn as an external gear, a ring gear Rg as an internal gear disposed coaxially with the sun gear Sn, and a carrier Cr that holds pinions 15 engaging with the sun gear Sn and ring gear Rg such that the pinions 15 can rotate about themselves and about the axis of the first driveshaft 10A. Thus, the power distribution mechanism 6 is a conventional gear mechanism in which the above three elements Sn, Rg and Cr can rotate at different speeds in different directions from each other. In this embodiment, the engine 3 is connected to the carrier Cr via the first driveshaft 10A, and the MG4 is coupled to the sun gear Sn, while the second driveshaft 10B is coupled to the ring gear Rg. With this arrangement, the first driveshaft 10A rotates integrally with the carrier Cr, and the second driveshaft 10B rotates integrally with the ring gear Rg. Thus, the carrier Cr is one example of first element according to the invention, and the sun gear Sn is one example of second element according to the invention, while the ring gear Rg is one example of third element according to the invention.

The transmission mechanism 7 is placed in one of a plurality of gear positions, by selecting one of change gear trains interposed between the driveshaft 10A or 10B and the output shaft 5, or coupling the first driveshaft 10A to the output shaft 5 without involving any change gear train. The transmission mechanism 7 provides a plurality of gear positions comprising six forward-drive gear positions and one rear-drive gear position. The six forward-drive gear positions are first-speed, second-speed, third-speed, forth-speed, fifth-speed and sixth-speed gear positions (which may also be called "first gear", "second gear", "third gear", "fourth gear", "fifth gear" and "sixth gear"), which are set stepwise in decreasing order of the gear ratio or speed ratio over a range from the power distribution mechanism 6 to the output shaft 5. Of these gear positions, the fifth-speed gear position is a direct-drive position established by coupling the first driveshaft 10A directly to the output shaft 5 without involving any change gear train, and the gear ratio of this position is equal to 1.

The first driveshaft 10A protrudes from an end portion of the second driveshaft 10B, and a 1st-speed/reverse drive gear 16 for shared use in first gear and reverse gear and a 3rd-speed drive gear 17 for use in third gear are mounted on a portion of the first driveshaft 10A which protrudes from the second driveshaft 10B. Also, a 2nd-speed drive gear 18 for use in second gear and a 4th-speed/6th-speed drive gear 19 for shared use in fourth gear and sixth gear are mounted on the second driveshaft 10B.

The transmission mechanism 7 includes two countershafts 20A, 20B disposed in parallel with the driveshafts 10A, 10B. Driven gears 21-24 that are in mesh with the respective drive gears 16-19 are rotatably mounted on the first countershaft 20A. A first counter gear 31 that is in mesh with an output gear 30 that rotates with the output shaft 5 is mounted on an end portion of the first countershaft 20A, such that the counter gear 31 can rotate integrally with the countershaft 20A. Also, a driven gear 26 that is in mesh with the drive gear 19 mounted on the second driveshaft 10B, and a driven gear 29 for use in reverse gear are mounted on the second countershaft 20B. The reverse driven gear 29 engages with the drive gear 16 mounted on the first driveshaft 10A, via an intermediate gear 33 interposed therebetween. A second counter gear 32 that is in mesh with the output gear 30 is mounted on an end portion of the second countershaft 20B, such that the counter gear 32 can rotate integrally with the countershaft 20B.

Suitable combinations of the gears mounted on the driveshafts 10A, 10B and the countershafts 20A, 20B engage with each other so as to provide a plurality of change gear trains having different gear ratios. More specifically, a change gear train 41 that provides the first-speed gear position consists of the gears 16, 21 provided between the first driveshaft 10 and the first countershaft 20A, and a change gear train 42 that provides the second-speed gear position consists of the gears 18, 22 provided between the second driveshaft 10B and the first countershaft 20A, while a change gear train 43 that provides the third-speed gear position consists of the gears 17, 23 provided between the first driveshaft 10A and the first countershaft 20A, and a change gear train 44 that provides the fourth-speed gear position consists of the gears 19, 24 provided between the second driveshaft 10B and the first countershaft 20A. A change gear train 46 that provides the sixth-speed gear position consists of the gears 19, 26 provided between the second driveshaft 10B and the second countershaft 20B, and a change gear train 50 that provides reverse-drive gear position consists of the gears 16, 33, 29 provided between the first driveshaft 10A and the second countershaft 20B.

While the first driveshaft 10A and the second driveshaft 10B are assembled coaxially with each other, the 1st-speed drive gear 16 having the largest gear ratio is mounted on the first driveshaft 10A as the inner shaft. Since the first-speed gear position needs to provide the largest gear ratio, the 1st-speed drive gear 16 needs to be formed with the smallest gear radius. If the 1st-speed drive gear 16 were mounted on the second driveshaft 20B as the outer shaft, the gear radius of the drive gear 16 would be naturally large. In this case, the gear radius of the driven gear 21 that meshes with the drive gear 16 would also be increased so as to provide a desired gear ratio, resulting in an increase in the distance between the first driveshaft 10A and the first countershaft 20A. In this embodiment in which the 1st-speed drive gear 16 is mounted on the inner, first driveshaft 10A, the distance between the axis of the first driveshaft 10A and that of the first countershaft 20A can be reduced as compared with the case where the drive gear 16 is mounted on the second driveshaft 20B, thus achieving reduction of the radial dimension or size of the drive system 2A. Consequently, the possibility of successful installation of the drive system 2A on the vehicle is increased, and the weight of the drive system 2A may be reduced. In the above-described case, the first countershaft 20A is one example of countershaft according to the invention.

The drive gear 19 mounted on the second driveshaft 10B is shared to establish the fourth-speed gear position and the six-speed gear position, and the 4th-speed change gear train 44 and the 6th-speed change gear train 46 are aligned with each other in radial directions. Namely, the change gear train 44 and the change gear train 46 are positioned so as to overlap each other as viewed in the axial direction. Since the drive gear 19 is used in both of the fourth-speed and sixth-speed gear positions, the dimension of the drive system 2A as measured in the axial direction can be reduced. Also, since the drive gear 19 is shared between the sixth-speed gear position having the smallest gear ratio and the fourth-speed gear position having a gear ratio that is larger by two steps than that of the sixth-speed gear position, the distance between the axis of the first countershaft 20A and that of the second countershaft 20B can be reduced as compared with the case where the driver gear is shared between gear positions whose gear ratios are different by three steps or more from each other. In this case, the 6th-speed change gear train 46 is one example of first change gear train according to the invention, and the 4th-speed change gear train 44 is one example of second change gear train according to the invention. Also, the second driveshaft 10B is one example of driveshaft according to the invention.

The change gear train 50 that provides the reverse-drive gear position is positioned so as to overlap the change gear train 41 that provides the first-speed gear position in the axial direction, and the drive gear 16 is included in both the change gear train 50 and the change gear train 41. The drive gear 16 for use in first gear has the smallest gear radius. Therefore, the gear radius of the driven gear 29 for use in reverse gear can be made relatively large. As a result, the speed reduction ratio of the reverse-drive gear position can be made large within a limited space.

The second countershaft 20B is shared between the change gear train 46 for the sixth-speed gear position and the change gear train 50 for the reverse-drive gear position, and is formed as another shaft, independently of or separately from the first countershaft 20A on which the change gear trains 41-44 for the other gear positions are mounted. With this arrangement, the gear ratios can be set individually for the respective countershafts. For the reverse-drive gear position and the sixth-speed gear position, for example, the necessity to take account of continuity across the gear ratios in view of the driveability is low. Accordingly, the gear ratios of these gear positions can be set independently of or irrespective of the gear ratios of the other gear positions; therefore, the gear ratio of the sixth-speed gear position having the smallest gear ratio, for example, can be set more freely, i.e., within an increased range. Thus, the setting of the optimum gear ratio, for improvement of the fuel economy, can be easily achieved. For the gear positions of which continuity across the gear ratios are deemed important, the change gear trains that provide these gear positions are mounted on the same first countershaft 20A, and therefore, the gear ratios of the respective gear positions can be set freely in view of the driveability.

The transmission mechanism 7 includes first clutch S1, second clutch S2 and fourth clutch S4 for selectively coupling the driven gears 21-24, 26, 29 to a corresponding one of the countershafts 20A, 20B, so that power is transmitted from the power distribution mechanism 6 to the output shaft 5, via a selected one of the change gear trains 41-46, 50 interposed between the power distribution mechanism 6 and the output shaft 5. The transmission mechanism 7 also includes a third clutch S3 adapted to connect the first driveshaft 10A with the output shaft 5, so as to establish the fifth-speed gear position as the direct-drive position, or disconnect the first driveshaft 10A from the outer shaft 5. Each of the clutches S1-S4 takes the form of a conventional dog clutch. The first clutch S1 is disposed between the 1st-speed driven gear 21 and the 3rd-speed driven gear 23, and the second clutch S2 is disposed between the 2nd-speed driven gear 22 and the 4th-speed driven gear 24, while the third clutch S3 is disposed between the first driveshaft 10A and the output shaft 5, and the fourth clutch S4 is disposed between the 6th-speed driven gear 26 and the reverse-drive driven gear 29. Since the fourth clutch S4 is shared between the sixth-speed gear position and the reverse-drive gear position, the axial dimension of the drive system 2A is made smaller than that in the case where a clutch exclusively used for reverse gear is additionally provided.

The first clutch S1 includes a hub 51 formed integrally with the first countershaft 51, a sleeve 52 that is fitted via splines on the hub 51 to be movable in the axial direction, splines 53 formed integrally with the 1st-speed driven gear 21 and engageable with splines of the sleeve 52, and splines 54 formed integrally with the 3rd-speed driven gear 23 and engageable with the splines of the sleeve 52. With this arrangement, the sleeve 52 may be moved to the 1st-speed driven gear 21 for engagement with the splines 53, so that the driven gear 21 is connected to the first countershaft 20A to be rotatable with the countershaft 20A. As a result, the power of the first driveshaft 10A is transmitted to the output shaft 5 via the change gear train 41, so as to establish the first-speed gear position having the largest gear ratio. Also, the sleeve 52 of the first clutch S1 may be moved to the 3rd-speed driven gear 23 for engagement with the splines 54, so that the driven gear 23 is connected to the first countershaft 20A to be rotatable with the countershaft 20A. As a result, the power of the first driveshaft 10A is transmitted to the output shaft 5 via the change gear train 43, so as to establish the third-speed gear position. Thus, the first clutch S1 is selectively operable among an operating position P1 for establishing the first-speed gear position, an operating position P3 for establishing the third-speed gear position, and a neutral position N in which the driven gears 21, 23 are disconnected from the first countershaft 20A. Thus, the first clutch S1 can selectively establish the first-speed gear position and the third-speed gear position.

Similarly, the second clutch S2 for selectively establishing the second-speed gear position and the fourth-speed gear position includes a hub 55 formed integrally with the first countershaft 20A, a sleeve 56 that is fitted via splines on the hub 55, splines 57 formed integrally with the 2nd-speed driven gear 22, and splines 58 formed integrally with the 4th-speed driven gear 24. With this arrangement, the second clutch S2 is selectively operable among an operating position P2 for establishing the second-speed gear position, an operating position P4 for establishing the fourth-speed gear position, and a neutral position N in which the driven gears 22, 24 are disconnected from the first countershaft 20A. The fourth clutch S4 for selectively establishing the sixth-speed gear position and the reverse-drive gear position includes a hub 60 formed integrally with the second countershaft 20B, a sleeve 61 that is fitted via splines on the hub 60, splines 62 formed integrally with the 6th-speed driven gear 26, and splines 63 formed integrally with the reverse-drive driven gear 29. With this arrangement, the fourth clutch S4 is selectively operable among an operating position P6 for establishing the sixth-speed gear position, an operating position PR for establishing the reverse-drive gear position, and a neutral position N in which the driven gears 26, 29 are disconnected from the second countershaft 20B.

The third clutch S3 for establishing the fifth-speed gear position as the direct-drive position includes a hub 65 formed integrally with the output shaft 5, a sleeve 66 that is fitted via splines on the hub 65 to be movable in the axial direction relative to the hub 65, and splines 67 formed integrally with the first driveshaft 10A and engageable with splines of the sleeve 66. With this arrangement, the sleeve 66 may be moved toward the first driveshaft 10A to be engaged with the splines 67, so that the first driveshaft 10A and the output shaft 5 are coupled to each other to be rotatable as a unit. The sleeve 66 may also be moved to the position illustrated in FIG. 1, so that the first driveshaft 10A and the output shaft 5 are disconnected from each other. Namely, the third clutch S3 is operable between an operating position P5 for establishing the fifth-speed gear position, and a neutral position N in which the first driveshaft 10A and the output shaft 5 are disconnected from each other.

The drive system 2A is provided with a lock clutch SL as a differential lock mechanism for inhibiting differential rotation of the elements of the power distribution mechanism 6. The lock clutch SL is operable to switch the power distribution mechanism 6 between a locked state in which the first driveshaft 10A and the second driveshaft 10B are coupled to each other to be rotatable as a unit so that differential rotation of the power distribution mechanism 6 is inhibited, and a released state in which differential rotation of the power distribution mechanism 6 is allowed. When the first driveshaft 10A and the second driveshaft 10B are coupled to each other by means of the lock clutch SL, the carrier Cr and ring gear Rg of the power distribution mechanism 6, which are coupled to the first driveshaft 10A and the second driveshaft 10B, respectively, rotate at the same speed, and therefore, differential rotation of the elements, i.e., sun gear Sn, ring gear Rg and carrier Cr, is inhibited.

The lock clutch SL takes the form of a conventional dog clutch, and includes a hub 70 formed integrally with the first driveshaft 10A, a sleeve 71 that is fitted via splines on the hub 70 to be movable in the axial direction relative to the hub 70, and splines 72 formed integrally with the second driveshaft 10B and engageable with splines of the sleeve 71. With this arrangement, the sleeve 71 of the lock clutch SL may be moved toward the second driveshaft 10B to be engaged with the splines 72, so that the first driveshaft 10A and the second driveshaft 10B are coupled to each other to be rotatable as a unit, and the power distribution mechanism 6 is switched to the locked state. The sleeve 71 may also be moved to the position illustrated in FIG. 1, so that the first driveshaft 10A and the second driveshaft 10B are disconnected from each other, and the power distribution mechanism 6 is switched to the released state. Namely, the lock clutch SL is operable between an operating position PL for placing the power distribution mechanism 6 in the locked state, and a neutral position N for placing the power distribution mechanism 6 in the released state.

The lock clutch SL is located adjacent to an end portion of the second driveshaft 10B, and is disposed between the first driveshaft 10A and the fourth clutch S4 as a switching clutch. Namely, the lock clutch SL and the fourth clutch S4 are positioned so as to overlap each other as viewed in the axial direction. Therefore, the dimension of the drive system 2A as measured in the axial direction is prevented from increasing due to the addition of the lock clutch SL. If the lock clutch SL were located in the vicinity of the power distribution mechanism 6, the arrangement around the MG 4 would be complicated. In this case, it would be difficult to locate the MG 4 so as to overlap or surround the power distribution mechanism 6, and the MG 4 would have to be located behind the power distribution mechanism 6. Generally, a floor tunnel of the FR vehicle is shaped such that its interior space is narrowed toward the rear of the vehicle. In view of the shape of the floor tunnel, it is advantageous to install the MG as closest to the front of the vehicle as possible, since the torque produced by the MG increases in proportion to the second to third power of the radius of the MG. If the radius of the MG is reduced, the dimension of the MG as measured in the axial direction must be increased so as to provide the same torque as that provided when the radius of the MG is not reduced. As is understood from the above description, the lock clutch SL is located in a rearward position apart from the power distribution mechanism 6, so that the MG4 can be installed in a front portion of the drive system 2A (close to the front of the vehicle), whereby the axial dimension of the MG 4 can be reduced.

To each of the above-described clutches SE, S1-S4, SL is connected one actuator (not shown) for driving the corresponding clutch. The actuators for the above clutches are operated by an electronic control unit (ECU) 75 provided as a control device for controlling the drive system 2A. The actuators may be in the form of electromagnetic actuators or hydraulic actuators. The ECU 75 operates each of the actuators so as to control each of the clutches SE, S1-S4, SL according to certain logic. The ECU 75 controls the operation of the MG 4 in accordance with the engagement/disengagement of each of the clutches, so that the drive system 2 operates in many different operating patterns provided by combinations of a plurality of drive modes using different driving sources, and a plurality of gear positions having different gear ratios.

FIG. 2 is a clutch engagement table that indicates correspondences between the operating patterns of the drive system 2A and the operating states of the respective clutches. In FIG. 2, symbols P1-P6, PR denote the operating positions of the above-described clutches S1-S4, and symbol "X" denotes the neutral position of the clutches S1-S4 or the released or disengaged state of the engine clutch SE and lock clutch SL. Symbol "◯" denotes the engaged state of the engine clutch SE or the lock state of the lock clutch SL. Symbol "-" denotes that the lock clutch SL may be in the lock state or released state. In the rows headed with "1st-2nd", "2nd-3rd", etc. in FIG. 2, the operating states of the respective clutches during a transition or shifting between two adjacent gear positions are indicated. Control during a transition between certain gear positions will be described later.

As shown in FIG. 2, the drive system 2A is arranged to implement a selected one of four drive modes, i.e., EV mode, Eng mode, Eng+MG mode and CVT mode. In the EV mode, the drive system 2A operates using only the MG 4 as a driving source, without utilizing the output of the internal combustion engine 3. In the Eng mode, the drive system 2A operates using only the engine 3 as a driving source, without utilizing the output of the MG 4. In the Eng+MG mode, both of the engine 3 and the MG 4 are used as driving sources while the power distribution mechanism 6 is held in a locked state. In the CVT mode, both of the engine 3 and the MG 4 are used as driving sources while the elements of the power distribution mechanism 6 are allowed to rotate in a differential fashion (at different speeds and/or in different directions), and the operation of the MG 4 is controlled in certain gear positions so as to continuously change the gear ratio or speed ratio over a range from the engine 3 to the output shaft 5. Of these drive modes, the EV mode, Eng mode and Eng+MG mode can be implemented in each of the gear positions (i.e., first-speed through six-speed gear positions and reverse-drive gear position). In the CVT mode, the speed ratio is continuously changed by controlling the output of the ring gear Rg of the power distribution mechanism 6. Therefore, the CVT mode can be implemented in even-numbered gear positions, i.e., the second-speed, fourth-speed and sixth-speed gear positions for which the drive gears are mounted on the second driveshaft 10B that rotates with the ring gear Rg.

Figure 4:
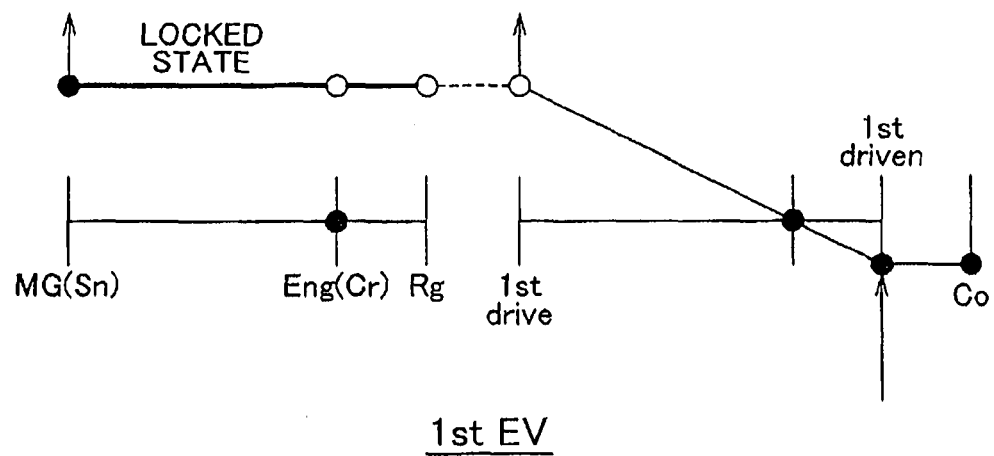
FIG. 4 is a view showing one example of alignment chart showing the operation of the drive system of the first embodiment in the first-gear EV mode.

Referring to FIG. 3 through FIG. 10, each of the drive modes will be explained. FIG. 3 shows a power transmission path through which power is transmitted when the drive system 2A operates in first gear in the EV mode, and FIG. 4 is one example of alignment chart showing the operation of the drive system 2A in the first-gear EV mode. In the alignment chart of FIG. 4, "Eng" denotes the internal combustion engine 3, "MG" denotes the MG 4, and "Co" denotes the counter gear 31 of the first countershaft 20A. Also, "drive" denotes a drive gear corresponding to the gear position concerned (first gear in FIG. 4), and "driven" denotes a driven gear corresponding to the gear position concerned (first gear). The meanings of these symbols apply for alignment charts of other figures.

As shown in FIG. 3, in the EV mode in which only the MG 4 is used as a driving source, the engine clutch SE is placed in a released state, and power transmission from the engine 3 is cut off. The lock clutch SL is placed in a lock state (operating position PL) so as to transmit power of the MG 4 to the first driveshaft 10A via the power distribution mechanism 6. As a result, differential rotation of the respective elements (Sn, Rg, Cr) of the power distribution mechanism 6 is inhibited, and the elements rotate as a unit at the same speed, as shown in FIG. 4. The power of the MG 4 transmitted to the first driveshaft 10A is transmitted to the 1st-speed drive gear 16. As shown in FIG. 3, the first clutch S1 is operated to the operating position P1, so that the driven gear 21 that meshes with the drive gear 16 is coupled to the first countershaft 20A. Therefore, the rotation of the first driveshaft 10A is transmitted to the first countershaft 20A after the speed of the rotation is reduced by the change gear train 41 consisting of the drive gear 16 and driven gear 21 that mesh with each other. The rotation of the first countershaft 20A is delivered to the counter gear 31, and is then transmitted to the output shaft 5 after its speed is changed by the output gear 30 that meshes with the counter gear 31. In this manner, in the EV mode (first gear), the power of the MG 4 is transmitted to the output shaft 5 via the power transmission path indicated by the thick line in FIG. 3.

Figure 5:
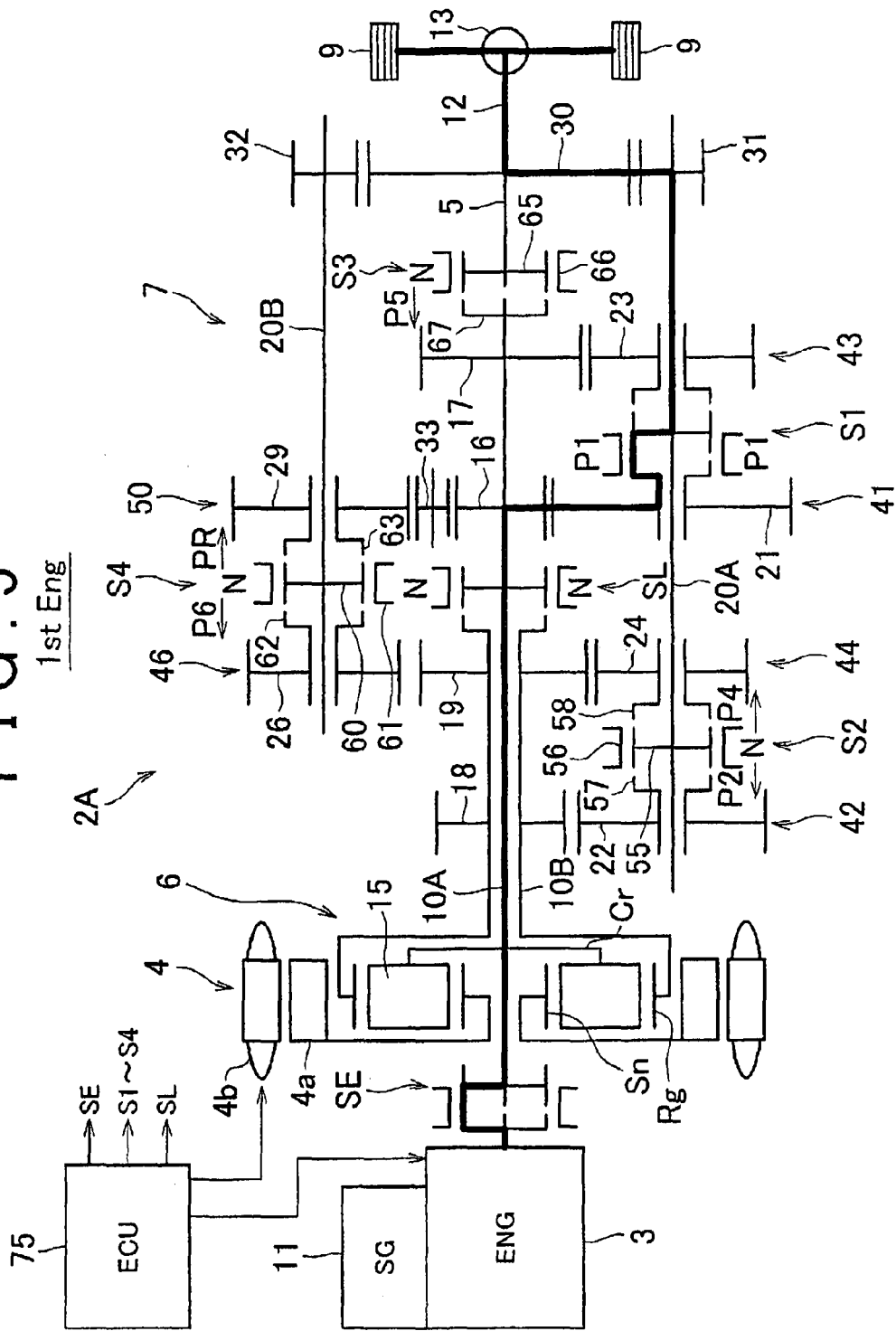
FIG. 5 is a view showing a power transmission path established in a first-gear Eng mode in the first embodiment.
Figure 6:
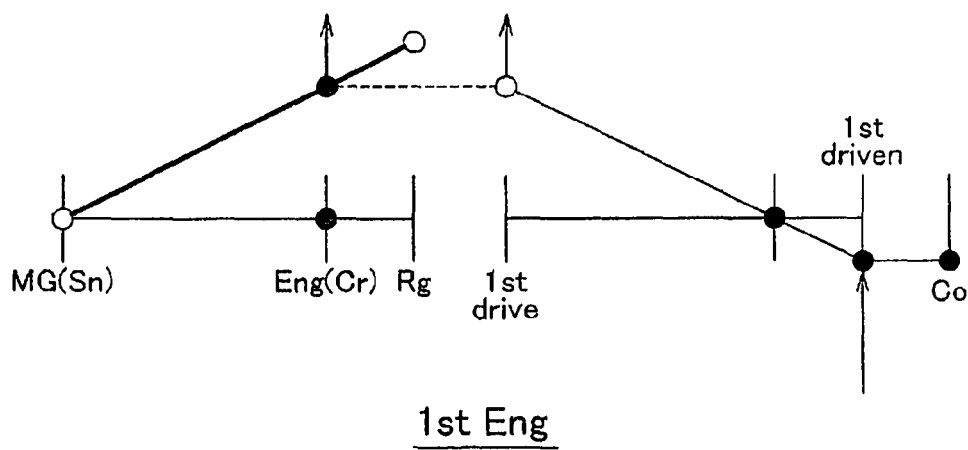
FIG. 6 is a view showing one example of alignment chart showing the operation of the drive system of the first embodiment in the first-gear Eng mode.

FIG. 5 shows a power transmission path through which power is transmitted when the drive system 2A operates in first gear in the Eng mode, and FIG. 6 is one example of alignment chart showing the operation of the drive system 2A in the first-gear Eng mode. As shown in FIG. 5, in the Eng mode in which only the engine 3 is used as a driving source, the power of the engine 3 is transmitted to the first driveshaft 10A via the engine clutch SE that is placed in an engaged state. The MG 4 is stopped with no electric power supplied to the MG 4 (refer to FIG. 6). In the case of FIG. 5, the lock clutch SL is placed in a released state so as to reduce the load of the engine 3. However, where electric power is to be generated by the MG4, for example, the lock clutch SL may be placed in a lock state, so that a part of the power of the engine 3 is used to drive the MG 4. Power transmission from the first driveshaft 10A to the output shaft 5 is effected in the same manner as in the EV mode. In the Eng mode (first gear), the power of the engine 3 is transmitted to the output shaft 5 via a power transmission path indicated by the thick line in FIG. 5.

Figure 7:
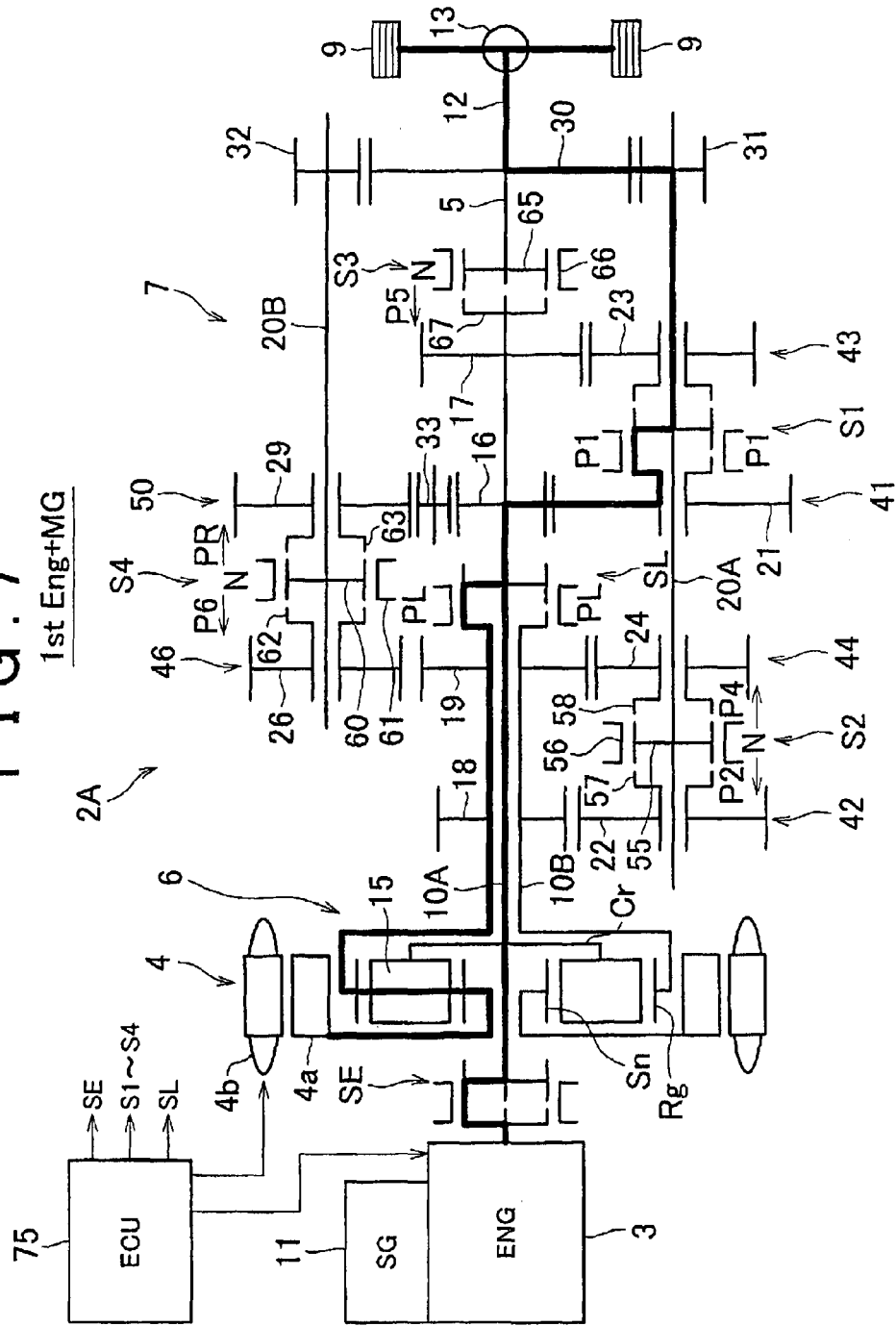
FIG. 7 is a view showing a power transmission path established in a first-gear Eng+MG mode in the first embodiment.
Figure 8:
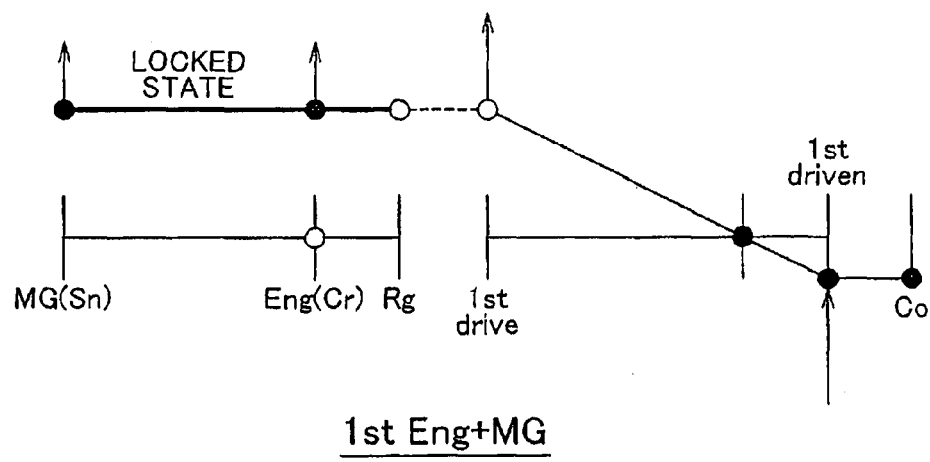
FIG. 8 is a view showing one example of alignment chart showing the operation of the drive system of the first embodiment in the first-gear Eng+MG mode.

FIG. 7 shows a power transmission path through which power is transmitted when the drive system 2A operates in first gear in the Eng+MG mode, and FIG. 8 is one example of alignment chart showing the operation of the drive system 2A in the first-gear Eng+MG mode. As shown in FIG. 7, in the Eng+MG mode in which both of the engine 3 and the MG 4 are used as driving sources while the power distribution mechanism 6 is in a locked state, the engine clutch SE is placed in an engaged state, and the lock clutch SL is placed in a lock state. As a result, the elements of the power distribution mechanism 6 rotate as a unit at the same speed, as shown in FIG. 8. Since the first driveshaft 10A and the second driveshaft 10B are coupled to each other by the lock clutch SL, the power of the engine 3 and the power of the MG4 are combined and transmitted to the 1st-speed drive gear 16, via the respective driveshafts 10A, 10B. The power transmission from the first driveshaft 10A to the output shaft 5 is effected in the same manner as in the EV mode. In the Eng+MG mode (first gear), the power of the engine 3 and the power of the MG 4 are transmitted to the output shaft 5 via power transmission paths indicated by thick lines in FIG. 5.

While the EV mode, Eng mode and Eng+MG mode for the first-speed gear position have been explained above with reference to FIG. 3 through FIG. 8, the EV, Eng and Eng+MG modes for the other gear positions are substantially the same as those for the first-speed gear position, except for paths from the first driveshaft 10A or second driveshaft 10B to the output shaft 5. In the Eng mode for even-numbered gear positions, the lock clutch SL needs to be placed in the lock state (refer to FIG. 2 and FIG. 5), since the 2nd-speed, 4th-speed and 6th-speed drive gears are mounted on the second driveshaft 10B.

Figure 9:
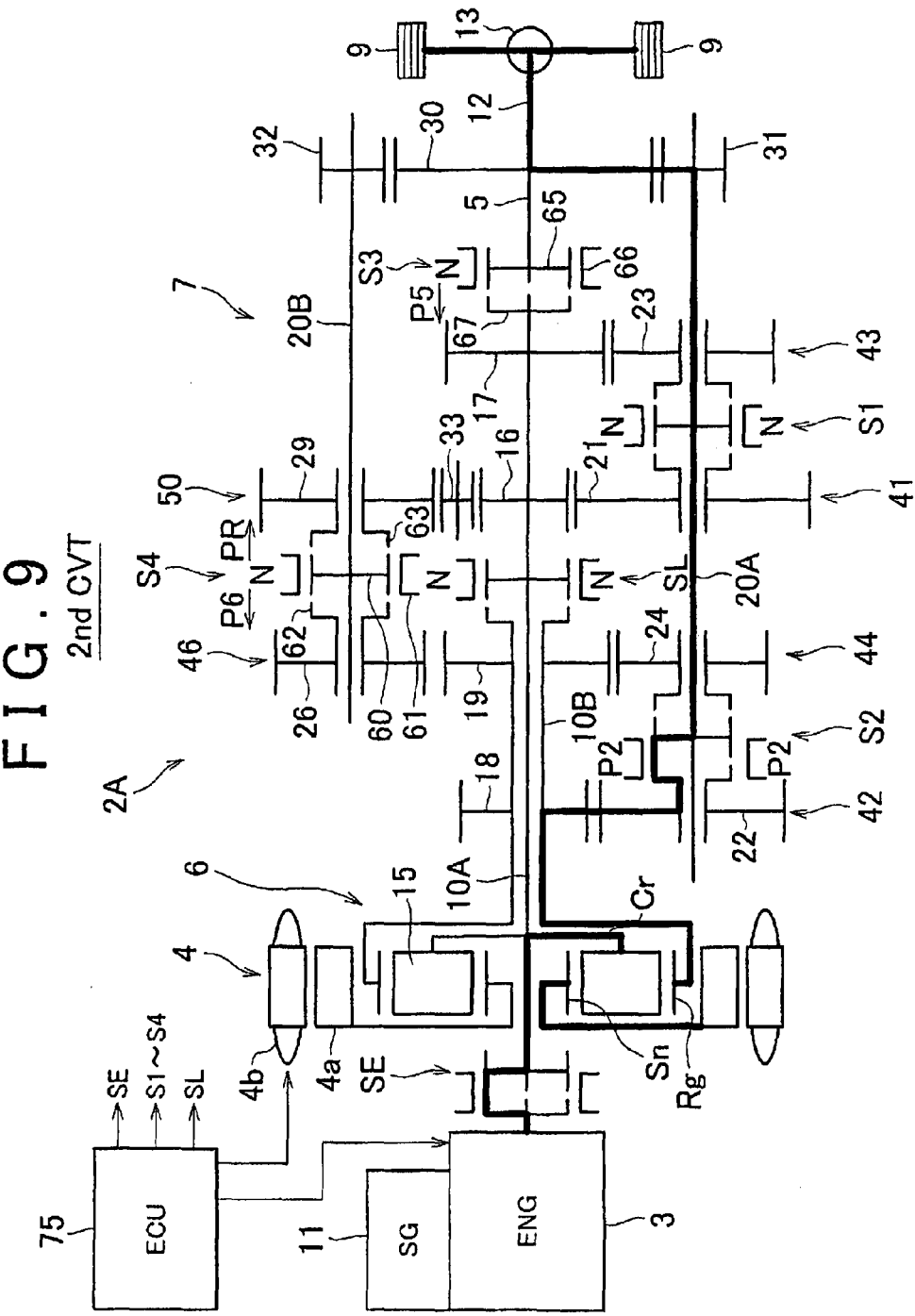
FIG. 9 is a view showing a power transmission path established in a second-gear CVT mode in the first embodiment.
Figure 10:
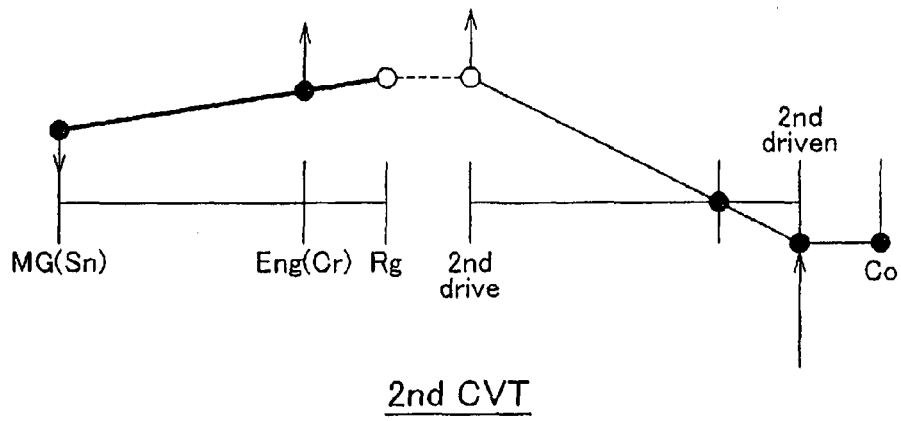
FIG. 10 is a view showing one example of alignment chart showing the operation of the drive system of the first embodiment in the second-gear CVT mode.

Next, the CVT mode that is implemented in even-numbered gear positions will be explained. FIG. 9 shows a power transmission path through which power is transmitted when the drive system 2A operates in second gear in the CVT mode, and FIG. 8 is one example of alignment chart showing the operation of the drive system 2A in the second-gear CVT mode. As shown in FIG. 9, in the CVT mode in which the power of the engine 3 and the power of the MG 4 are combined by the power distribution mechanism 6, the lock clutch SL is placed in a released or disengaged state so that the elements of the power distribution mechanism 6 rotate in a differential fashion, and the engine clutch SE is placed in an engaged state so that the power of the engine 3 is introduced into the power distribution mechanism 6. Accordingly, the power of the engine 3 and the power of the MG 4 are transmitted to the output shaft 5 in the CVT mode via power transmission paths as indicated by thick lines in FIG. 9. As shown in FIG. 10, the rotational speed of the ring gear Rg as an output element can be controlled as desired by controlling the MG 4, so that the speed ratio over a range from the engine 3 to the counter gear 31 can be continuously changed while the transmission mechanism 7 is held in the second-speed gear position (i.e., the gear ratio of the transmission is fixed to second gear). In fourth gear and sixth gear as even-numbered gear positions other than second gear, power is transmitted in the CVT mode through the same power transmission path as that in the case of second gear as shown in FIG. 9, except for paths from the second driveshaft 10B to the output shaft 5.

Figure 11A:
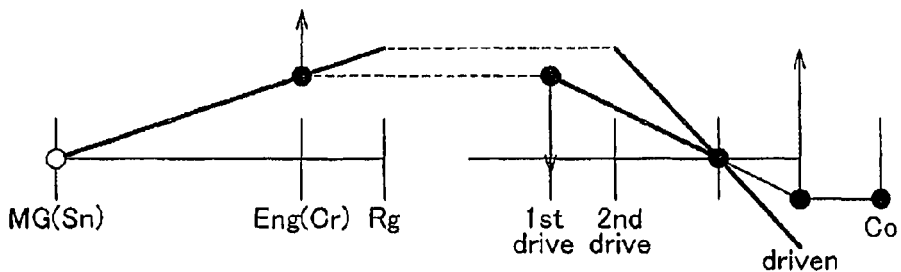
FIG. 11A is an alignment chart showing a first condition during shifting from first gear to second gear in the Eng+MG mode.

Next, the operation of the drive system 2A during shifting of gears will be described with reference to FIG. 1 and FIG. 11A-FIG. 11E. FIG. 11A-FIG. 11E are alignment charts illustrating operating conditions of the drive system 2A during the first-to-second gear upshift in the Eng+MG mode. FIG. 11A illustrates a condition where the lock clutch SL is placed in a released or disengaged state and the MG4 is stopped. In this condition, the torque of the engine 3 is directly applied to the first driveshaft 10A. In this case, the second driveshaft 10B rotates with the ring gear Rg, and the second clutch S2 is in the neutral position N; therefore, the rotational speed of the 2nd-speed driven gear 23 does not coincide with the rotational speed of the 1st-speed driven gear 21.

Figure 11B:
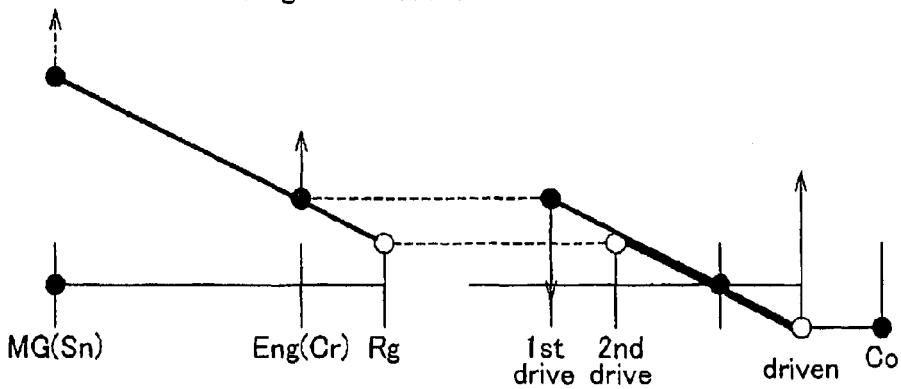
FIG. 11B is an alignment chart showing a second condition during shifting from first gear to second gear in the Eng+MG mode.
Figure 11C:
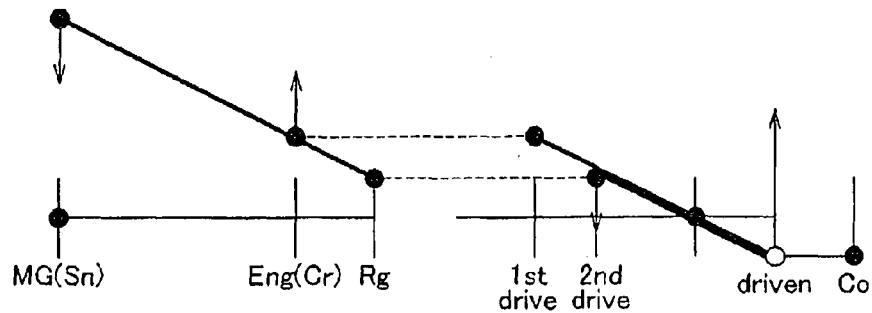
FIG. 11C is an alignment chart showing a third condition during shifting from first gear to second gear in the Eng+MG mode.

Then, synchronization control for making the rotational speeds of the 2nd-speed driven gear 23 and the 1st-speed driven gear 21 equal to each other is performed, as shown in FIG. 11B. In the synchronization control, the operation of the MG 4 is controlled so that the rotational speed of the 2nd-speed driven gear 22 becomes equal to the rotational speed of the 1st-speed driven gear 21 coupled to the first countershaft 20A. In other words, the second clutch S2 and the first clutch S1 are brought into synchronism with each other. Upon completion of the synchronization control, the rotational speed of the sleeve 56 of the second clutch S2 becomes equal to the rotational speed of the splines 57; therefore, the second clutch S2 is operated to the operating position P2 for establishing the second-speed gear position while the first clutch S1 is held in the operating position P1. FIG. 11C illustrates a so-called torque phase in which the transmission torque of the first clutch S1 is reduced from the condition of FIG. 11B, and the reduced part of the torque is transferred to the second clutch S2. In this case, the MG 4 bears the torque reaction force of the engine 3 so as to quickly accomplish transfer of torque from the first clutch S1 to the second clutch S2.

Figure 11D:
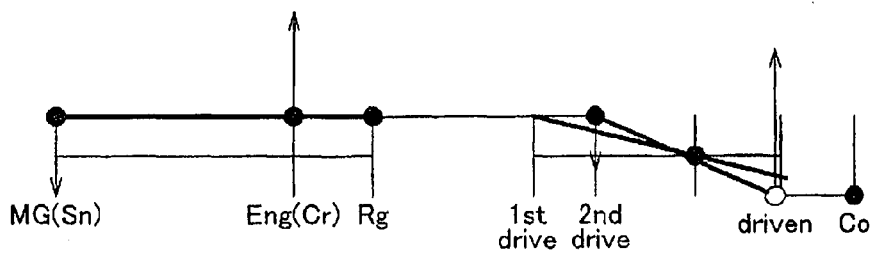
FIG. 11D is an alignment chart showing a fourth condition during shifting from first gear to second gear in the Eng+MG mode.
Figure 11E:
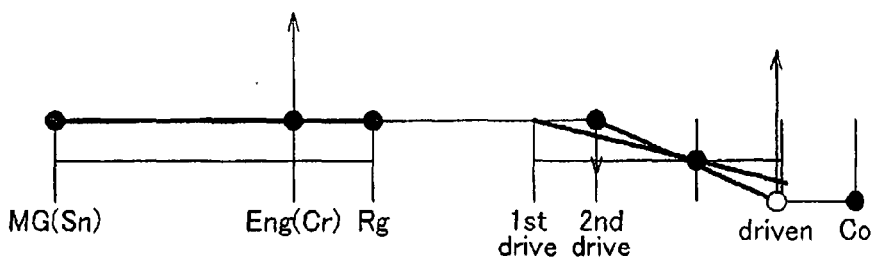
FIG. 11E is an alignment chart showing a fifth condition during shifting from first gear to second gear in the Eng+MG mode.

FIG. 11D illustrates a so-called inertia phase in which the first clutch S1 is operated to the neutral position N after completion of the torque transfer to the second clutch S2, so that the rotational speeds of the engine 3 and the MG 4 are reduced. In this case, the rotational speeds of the engine 3 and the MG 4 are reduced through the release or disengagement of the first clutch S1 until the rotational speeds of the elements of the power distribution mechanism 6 become equal to each other. FIG. 11E illustrates a condition where the lock clutch SL is switched from the released state to the lock (engaged) state at the time when the rotational speeds of the elements of the power distribution mechanism 6 become equal to each other. In this manner, the first-to-second gear upshift in the Eng+MG mode is accomplished. The above-described operation applies to shifting of other gears. For downshifts, the above-described procedure is reversed.

Figure 12:
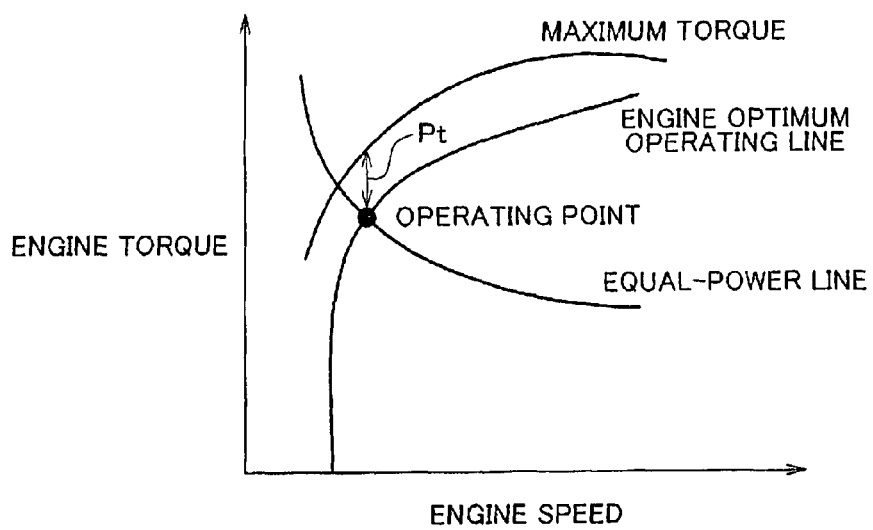
FIG. 12 is an explanatory view showing an engine optimum operating line, maximum torque and an equal-power line, in which the vertical axis indicates engine torque, and the horizontal axis indicates the engine speed.

The drive system 2A is arranged to implement the above-described CVT mode in the sixth-speed gear position having the smallest gear ratio. An advantage of this arrangement will be explained with reference to FIG. 12 and FIG. 13. FIG. 12, in which the vertical axis indicates the engine torque and the horizontal axis indicates the engine speed, is an explanatory view showing an engine optimum operating line, maximum torque, and an equal-power line.

Generally, the internal combustion engine 3 operates at the highest efficiency when the operating point of the engine 3 lies on the engine optimum operating line. However, since the operating point is determined by the gear ratio of the selected gear position, the operating point cannot be always located on the engine optimum operating line when the gear ratio varies stepwise (i.e., the gear ratio is not continuously variable). Accordingly, the gear ratio is set so that the operating point becomes as close to the engine optimum operating line as possible. For example, when the vehicle speed is about 120 km/h, the engine optimum operating line is located at the low-speed side, as shown in FIG. 12. Therefore, the fuel efficiency (fuel economy) is improved if the gear ratio of the highest gear position (having the smallest gear ratio) is set to a smaller value (high-geared) so that the engine speed is reduced as much as possible at the above-indicated vehicle speed. It is, however, to be noted that, if the gear ratio of the highest gear is simply set to a smaller value (high-geared), the excess driving force Pt represented by the width between the maximum torque and the operating point as shown in FIG. 12 is reduced. Accordingly, if the gear ratio is set in the above manner, downshifts are required to frequently occur because of insufficiency of the excess driving force Pt, and it is thus difficult to achieve both reduction of the engine speed through reduction of the gear ratio of the highest gear, and improvement of the driveability.

Figure 13:
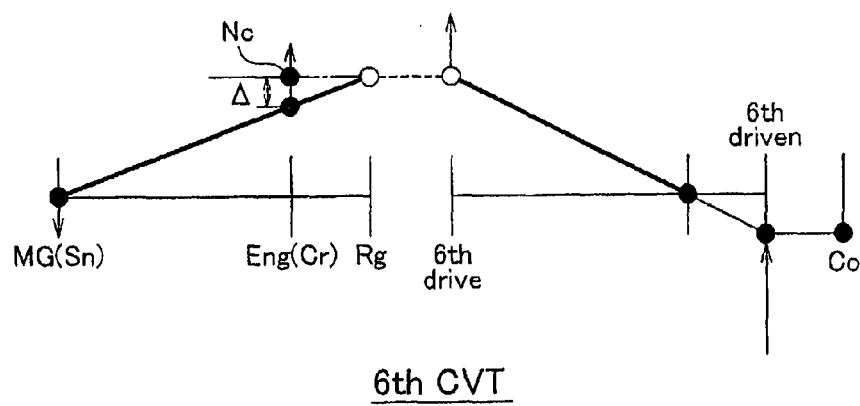
FIG. 13 is a view showing one example of alignment chart showing the operation of the drive system of the first embodiment in the sixth-gear CVT mode.

Since the drive system 2A of this embodiment is arranged to implement the CVT mode in the sixth-speed gear position as the highest gear, the reduction of the engine speed and the improvement of the driveability can be both achieved. FIG. 13 is one example of alignment chart illustrating the operation of the drive system 2A in sixth gear in the CVT mode. As shown in FIG. 13, the rotational speed of the MG 4 is controlled to substantially zero, so that the engine speed can be reduced to be lower by A than the engine speed Nc provided in the Eng mode. Namely, substantially the same effect as that obtained when the gear ratio of sixth gear is reduced (high-geared) can be obtained while the same vehicle speed as that in the case of the Eng mode is maintained. Also, losses associated with the MG 4 are small since the output of the MG 4 is substantially zero. It is thus possible to achieve reduction of the engine speed without reducing (high-gearing) the speed ratio of sixth gear, while at the same time achieving improvement of the driveability.

According to the basic shift schedule of the drive system 2A, the drive system 2A is shifted to an appropriate gear position, based on the vehicle speed and the accelerator pedal position, in substantially the same manner as in the known art. However, when the vehicle speed becomes equal to or higher than a specified value while the sixth-speed gear position as an overdrive gear position is established, the drive system 2A is controlled to be shifted down to the fifth-speed gear position as a direct-drive gear position. A control program for controlling the drive system 2A in this way is stored in the ECU 75, and is read and repeatedly executed at appropriate times. By executing the routine, the ECU 75 determines whether the vehicle speed becomes equal to or higher than the specified value during running in sixth gear, based on information received from a vehicle speed sensor (not shown), and operates suitable clutches and MG 4 to shift the gear position from sixth gear to fifth gear when the vehicle speed becomes equal to or higher than the specified value (e.g. 160 km/h). Thus, the ECU 75 functions as one example of control device according to the invention.

Figure 14:
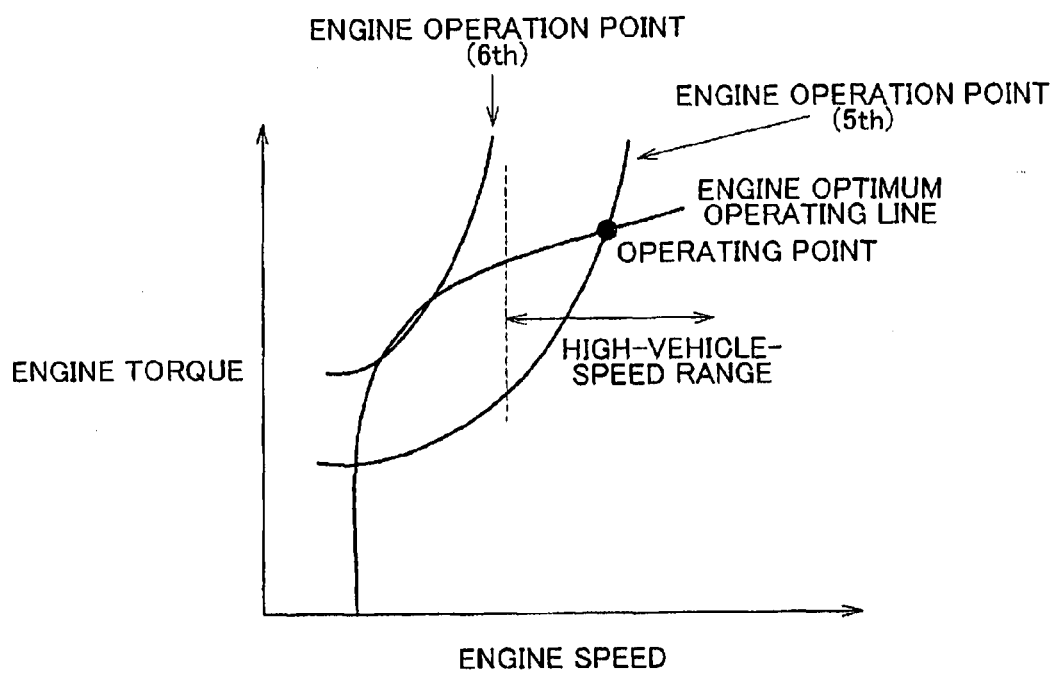
FIG. 14 is an explanatory view showing an engine optimum operating line, engine operating line (point) in sixth gear, and an engine operating line (point) in fifth gear, in which the vertical axis indicates engine torque, and the horizontal axis indicates the engine speed.

The reason why the downshift as described above is effected will be explained with reference to FIG. 14. FIG. 14, in which the vertical axis indicates the engine torque and the horizontal axis indicates the engine speed, is an explanatory view showing an engine optimum operating line, a sixth-gear engine operating line (point), and a fifth-gear engine operating line (point). As shown in FIG. 14, since the engine optimum operating line is located in a high-engine-speed region when the vehicle speed is in a high-vehicle-speed range equal to or higher than 160 km/h, the optimum gear ratio is at a slightly lower side (i.e., is slightly larger) than the gear ratio suitable for the vehicle speed of about 120 km/h. Accordingly, when the vehicle speed increases and enters a high-vehicle-speed range during running in sixth gear, it is more efficient for the drive system 2A to be shifted down to the fifth-speed gear position, rather than being kept in the sixth-speed gear position. Furthermore, since the fifth-speed gear position is a direct-drive gear position established without involving any change gear train, a loss due to engagement of teeth of gears can be reduced, resulting in improvement of the fuel economy. Since the loss due to engagement of gears increase in proportion to the torque, the greatest advantage is provided by selecting the fifth-speed gear position as the direct-drive position in a high-vehicle-speed range.

Figure 15:
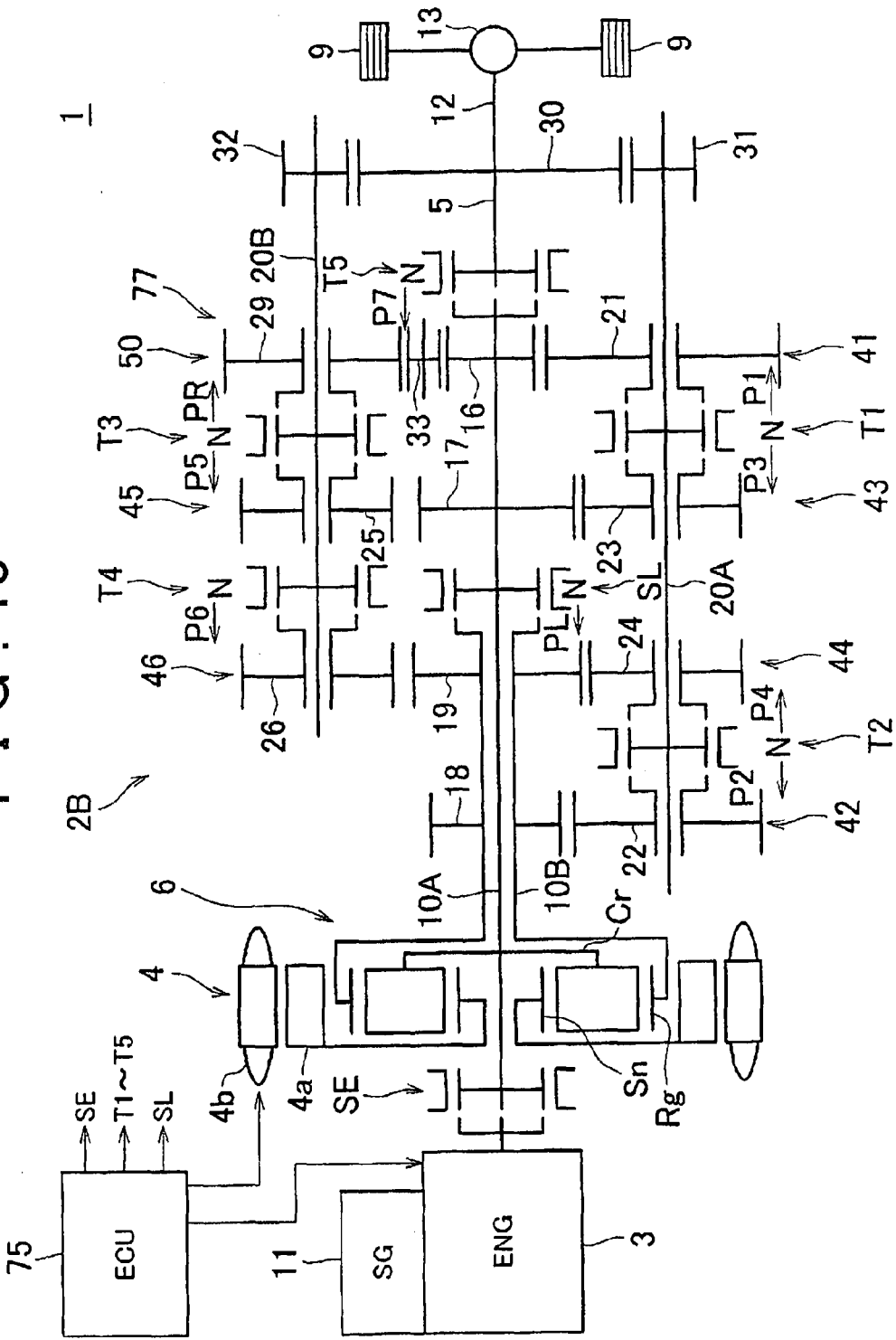
FIG. 15 is a view schematically showing a vehicle in which a drive system according to a second embodiment of the invention is employed.

Next, a drive system according to a second embodiment of the invention will be described with reference to FIG. 15 and FIG. 16. In the second embodiment, the same reference numerals as used in the first embodiment will be used for identifying the same or corresponding constituent elements, of which no further explanation will be provided. FIG. 15 schematically illustrates a vehicle 1 in which the drive system of the second embodiment is employed. The second embodiment is characterized in that the drive system provides seven forward-drive gear positions while avoiding an increase in the dimension of the system as measured in the axial direction, as compared with that of the first embodiment.

The drive system 2B includes a transmission mechanism 77 that provides a plurality of gear positions comprising seven forward-drive gear positions and one reverse-drive gear position. The seven forward-drive gear positions established by the transmission mechanism 77 are first-speed, second-speed, third-speed, forth-speed, fifth-speed, sixth-speed and seventh-speed gear positions (which may also be called "first gear", "second gear", "third gear", "fourth gear", "fifth gear", "sixth gear" and "seventh gear"), which are set stepwise in decreasing order of the gear ratio or speed ratio over a range from the power distribution mechanism 6 to the output shaft 5. Of these gear positions, the seventh-speed gear position is a direct-drive position established by coupling the first drive-shaft 10A directly to the output shaft 5 without involving any change gear train, and the gear ratio of this position is equal to 1.

The drive gear 16 for shared use in first gear and reverse gear and the drive gear 17 for shared use in third gear and fifth gear are mounted on the first driveshaft 10A. The positions of the drive gears 16, 17 in the transmission mechanism 77 are opposite to those of the first embodiment. Similarly to the first embodiment, the drive gear 18 for use in second gear and the drive gear 19 for shared use in fourth gear and sixth gear are mounted on the second driveshaft 10B.

The driven gears 21-24 that are in mesh with the respective drive gears 16-19 are rotatably mounted on the first countershaft 20A. A driven gear 25 that is in mesh with the drive gear 17 mounted on the first driveshaft 10A, driven gear 26 that is in mesh with the drive gear 19 mounted on the second driveshaft 10B, and a driven gear 29 for use in reverse gear are rotatably mounted on the second countershaft 20B. The driven gear 29 is engaged via an intermediate gear 33 with the drive gear 16 mounted on the first driveshaft 10A.

Suitable combinations of the gears mounted on the driveshafts 10A, 10B and the countershafts 20A, 20B engage with each other so as to provide a plurality of change gear trains having different gear ratios. In the second embodiment, the change gear trains are constructed as follows. A change gear train 41 that provides the first-speed gear position consists of the gears 16, 21 provided between the first driveshaft 10 and the first countershaft 20A, and a change gear train 42 that provides the second-speed gear position consists of the gears 18, 22 provided between the second driveshaft 10B and the first countershaft 20A, while a change gear train 43 that provides the third-speed gear position consists of the gears 17, 23 provided between the first driveshaft 10A and the first countershaft 20A, and a change gear train 44 that provides the fourth-speed gear position consists of the gears 19, 24 provided between the second driveshaft 10B and the first countershaft 20A. A change gear train 45 that provides the fifth-speed gear position consists of the gears 17, 25 provided between the first driveshaft 10A and the second countershaft 20B, and a change gear train 46 that provides the sixth-speed gear position consists of the gears 19, 26 provided between the second driveshaft 10B and the second countershaft 20B. A change gear train 50 that provides the reverse-drive gear position consists of the gears 16, 33, 29 provided between the first driveshaft 10A and the second countershaft 20B. The seventh-speed gear position is a direct-drive gear position in which the first drive gear 10A is coupled directly to the output shaft 5 with no change gear train interposed therebetween.

The change gear train 41 that provides the first-speed gear position is located at a position remotest from the engine 3, as compared with the other change gear trains. Since the first-speed gear position has the largest gear ratio, large torque is applied to the drive gear 16. The change gear train 41, when located remotest from the engine 3 as compared with the other change gear trains, is supported on an end portion of the first driveshaft 10A remote from the engine 3. Accordingly, deflection of the first driveshaft 10A can be suppressed, as compared with the case where the 1st-speed change gear train is supported at a position close to the middle of the first driveshaft 10A. In this case, the first driveshaft 10A is one example of driveshaft according to the invention, and the first countershaft 20A is one example of countershaft according to the invention.

The transmission mechanism 77 includes first clutch T1, second clutch T2, third clutch T3 and fourth clutch T4 for selectively coupling the driven gears 21-26, 29 to the corresponding countershaft 20A, 20B, so that power is transmitted from the power distribution mechanism 6 to the output shaft 5, via a selected one of the change gear trains 41-46, 50 interposed between the power distribution mechanism 6 and the output shaft 5. The transmission mechanism 77 also includes a fifth clutch T5 adapted to connect the first driveshaft 10A with the output shaft 5, so as to establish the seventh-speed gear position as the direct-drive position, or disconnect the first driveshaft 10A from the outer shaft 5. Each of the clutches T1-T5 takes the form of a conventional dog clutch, and has constituent elements similar to those of the clutch S1 and others of the first embodiment. While not illustrated in the drawings with reference numerals, each of the clutches T1-T5 has, as its constituent elements, a hub that rotates integrally with the countershaft or driveshaft, a sleeve fitted via splines on the hub, and splines that engage with splines of the sleeve and rotate integrally with the corresponding driven gear.

The first clutch T1 is disposed between the 1st-speed driven gear 21 and the 3rd-speed driven gear 23, and is selectively operable among an operating position P1 for establishing the first-speed gear position, an operating position P3 for establishing the third-speed gear position, and a neutral position N in which the driven gears 21, 23 are disconnected from the first countershaft 20A. The second clutch T2 is disposed between the 2nd-speed driven gear 22 and the 4th-speed driven gear 24, and is selectively operable among an operating position P2 for establishing the second-speed gear position, an operating position P4 for establishing the fourth-speed gear position, and a neutral position N in which the driven gears 22, 24 are disconnected from the first countershaft 20A. The third clutch T3 is disposed between the 5th-speed driven gear 25 and the reverse-drive driven gear 29, and is selectively operable among an operating position P5 for establishing the fifth-speed gear position, an operating position PR for establishing the reverse-drive gear position, and a neutral position N in which the driven gears 25, 29 are disconnected from the second countershaft 20B. The fourth clutch T4 is located adjacent to the 6th-speed driven gear 26, and is selectively operable between an operating position P6 for establishing the sixth-speed gear position, and a neutral position N in which the driven gear 26 is disconnected from the second countershaft 20B. The fifth clutch T5 adapted to establish the seventh-speed gear position as the direct-drive gear position is selectively operable between an operating position P7 for coupling the first driveshaft 10A to the output shaft 5 so as to establish the seventh-speed gear position, and a neutral position N for disconnecting the first driveshaft 10A from the output shaft 5. The clutches T1-T5 are controlled by the ECU 75 according to certain logic, as in the first embodiment. Also, the engine clutch SE and the lock clutch SL are controlled by the ECU 75 in the same manners as in the first embodiment. Thus, like the first embodiment, the drive system 2B of the second embodiment is operable in many different operating patterns as indicated in a clutch engagement table of FIG. 16, and yields substantially the same effects as those provided in the first embodiment. The clutch engagement table of FIG. 16 is to be interpreted in the same manner as the clutch engagement table of FIG. 2 of the first embodiment.

Figure 17:
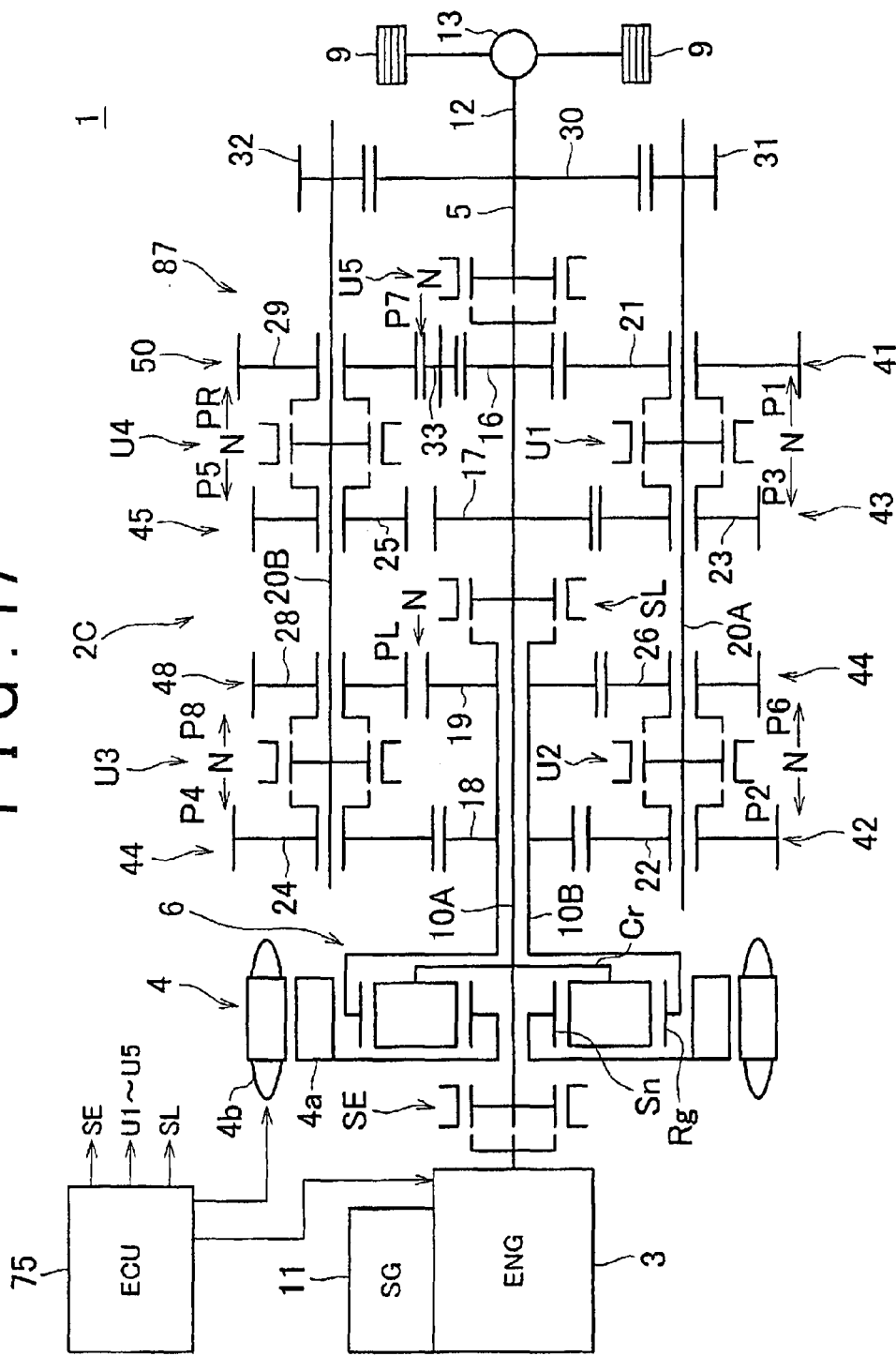
FIG. 17 is a view schematically showing a vehicle in which a drive system according to a third embodiment of the invention is employed.

Next, a drive system according to a third embodiment of the invention will be described with reference to FIG. 17 and FIG. 18. In the third embodiment, the same reference numerals as used in the first and second embodiments will be used for identifying the same or corresponding constituent elements, of which no further explanation will be provided. FIG. 17 schematically illustrates a vehicle in which the drive system of the third embodiment is employed. The third embodiment is characterized in that the drive system provides eight forward-drive gear positions while avoiding an increase in the dimension of the system as measured in the axial direction, as compared with that of the first embodiment.

The drive system 2C includes a transmission mechanism 87 that provides a plurality of gear positions comprising eight forward-drive gear positions and one reverse-drive gear position. The eight forward-drive gear positions established by the transmission mechanism 87 are 1st-speed, 2nd-speed, 3rd-speed, 4th-speed, 5th-speed, 6th-speed, 7th-speed and 8th-speed gear positions (which may also be called "first gear", "second gear", "third gear", "fourth gear", "fifth gear", "sixth gear", "seventh gear" and "eighth gear"), which are set stepwise in decreasing order of the gear ratio or speed ratio over a range from the power distribution mechanism 6 to the output shaft 5. Of these gear positions, the seventh-speed gear position is a direct-drive position established by coupling the first driveshaft 10A directly to the output shaft 5 without involving any change gear train, and the gear ratio of this position is equal to 1.

The drive gear 16 for shared use in first gear and reverse gear and the drive gear 17 for shared use in third gear and fifth gear are mounted on the first driveshaft 10A. The drive gear 18 for shared use in second gear and fourth gear and the drive gear 19 for shared use in sixth gear and eighth gear are mounted on the second driveshaft 10B.

The driven gears 21, 22, 23, 26 that mesh with the respective drive gears 16, 18, 17, 19 are rotatably mounted on the first countershaft 20A. Also, the driven gears 29, 24, 25, 28 that mesh with the respective drive gears 16, 18, 17, 19 are rotatably mounted on the second countershaft 20B.

Suitable combinations of the gears mounted on the driveshafts 10A, 10B and the countershafts 20A, 20B engage with each other so as to provide a plurality of change gear trains having different gear ratios. In the third embodiment, the change gear trains are constructed as follows. A change gear train 41 that provides the first-speed gear position consists of the gears 16, 21 provided between the first driveshaft 10 and the first countershaft 20A, and a change gear train 42 that provides the second-speed gear position consists of the gears 18, 22 provided between the second driveshaft 10B and the first countershaft 20A, while a change gear train 43 that provides the third-speed gear position consists of the gears 17, 23 provided between the first driveshaft 10A and the first countershaft 20A, and a change gear train 44 that provides the fourth-speed gear position consists of the gears 18, 24 provided between the second driveshaft 10B and the second countershaft 20B. A change gear train 45 that provides the fifth-speed gear position consists of the gears 17, 25 provided between the first driveshaft 10A and the second countershaft 20B, and a change gear train 46 that provides the sixth-speed gear position consists of the gears 19, 26 provided between the second driveshaft 10B and the first countershaft 20A, while a change gear train 48 that provides the eighth-speed gear position consists of the gears 19, 28 provided between the second drive shaft 10B and the second countershaft 20B. The seventh-speed gear position is a direct-drive gear position in which the first driveshaft 10A is coupled directly to the output shaft 5 with no change gear train interposed therebetween. A change gear train 50 that provides the reverse-drive gear position consists of the gears 16, 33, 29 provided between the first driveshaft 10A and the second countershaft 20B. The change gear train 41 that provides the first-speed gear position is located remotest from the engine 3, as compared with the other change gear trains, thus providing the same effect as that provided in the second embodiment.

The transmission mechanism 87 includes first clutch U1, second clutch U2, third clutch U3 and fourth clutch U4 for selectively coupling the driven gears 21-26, 28 29 to the corresponding countershaft 20A, 20B, so that power is transmitted from the power distribution mechanism 6 to the output shaft 5, via a selected one of the change gear trains 41-46, 50 interposed between the power distribution mechanism 6 and the output shaft 5. The transmission mechanism 87 also includes a fifth clutch U5 adapted to connect the first driveshaft 10A with the output shaft 5 so as to establish the seventh-speed gear position as the direct-drive position, or disconnect the first driveshaft 10A from the outer shaft 5. Each of the clutches T1-T5 takes the form of a conventional dog clutch, and has constituent elements similar to those of the clutch S1 and others of the first embodiment.

The first clutch U1 is disposed between the 1st-speed driven gear 21 and the 3rd-speed driven gear 23, and is selectively operable among an operating position P1 for establishing the first-speed gear position, an operating position P3 for establishing the third-speed gear position, and a neutral position N in which the driven gears 21, 23 are disconnected from the first countershaft 20A. The second clutch U2 is disposed between the 2nd-speed driven gear 22 and the 6th-speed driven gear 26, and is selectively operable among an operating position P2 for establishing the second-speed gear position, an operating position P6 for establishing the sixth-speed gear position, and a neutral position N in which the driven gears 22, 26 are disconnected from the first countershaft 20A. The third clutch U3 is disposed between the 4th-speed driven gear 24 and the 8th-speed driven gear 28, and is selectively operable among an operating position P4 for establishing the fourth-speed gear position, an operating position P8 for establishing the eighth-speed gear position, and a neutral position N in which the driven gears 24, 28 are disconnected from the second countershaft 20B. The fourth clutch U4 is disposed between the 5th-speed driven gear 25 and the reverse-drive driven gear 29, and is selectively operable among an operating position P5 for establishing the fifth-speed gear position, an operating position PR for establishing the reverse-drive gear position, and a neutral position N in which the driven gears 25, 29 are disconnected from the second countershaft 20B. The fifth clutch U5 adapted to establish the seventh-speed gear position as the direct-drive position is operable between an operating position P7 for coupling the first driveshaft 10A to the output shaft 5 so as to establish the seventh-speed gear position, and a neutral position N for disconnecting the first driveshaft 10A from the output shaft 5.

The clutches U1-U5 are controlled by the ECU 75 according to certain logic, as in the first embodiment. Also, the engine clutch SE and the lock clutch SL are controlled by the ECU 75 in the same manners as in the first embodiment. Thus, like the first embodiment, the drive system 2C of the third embodiment is operable in many different operating patterns as indicated in a clutch engagement table of FIG. 18, and yields substantially the same effects as those provided in the first embodiment. The clutch engagement table of FIG. 18 is to be interpreted in the same manner as the clutch engagement table of FIG. 2 of the first embodiment. In the third embodiment in which the eighth-speed gear position corresponds to the overdrive gear position, when the vehicle speed becomes equal to or higher than a specified value during running in eighth gear, the ECU 75 may control the drive system so as to shift the transmission from the eighth-speed gear position down to the seventh-speed gear position as the direct-drive gear position. In this case, the ECU 75 functions as one example of control device according to the invention.

It is to be understood that the invention is not limited to the embodiments as described above, but may be embodied in various forms within the scope of the invention. The arrangements or constructions of the power distribution mechanism and transmission mechanism as described above are mere examples thereof, and may be modified into other structurally equivalent forms. Also, the manners of connecting the rotary elements of the power distribution mechanism and transmission mechanism may be changed.

The invention claimed is:

1. A drive system of a vehicle, comprising:
   an internal combustion engine;
   an electric motor;
   an output member that delivers power to driving wheels of the vehicle;
   a differential mechanism that includes a first element, a second element and a third element capable of differential rotation relative to each other, said internal combustion engine being coupled to the first element, said electric motor being connected to the second element;
   a transmission mechanism that establishes a plurality of gear positions that are set stepwise in decreasing order of a gear ratio over a range from the differential mechanism to the output member, by switching among first change gear trains interposed between the first element of the differential mechanism and the output member for transmitting power from the first element to the output member or by switching among second change gear trains interposed between the third element of the differential mechanism and the output member for transmitting power from the third element to the output member, and coupling the first element to the output member without involving any of the change gear trains; and
   a differential lock mechanism that switches the differential mechanism between a locked state in which selected two of the first element, the second element and the third element of the differential mechanism are coupled to each other so as to be inhibited from differential rotation, and a released state in which the inhibition of the differential rotation is cancelled, wherein
   the electric motor comprises a stator, and a rotor that is disposed coaxially with the stator and has a space formed radially inside thereof;
   the differential mechanism is placed in the space formed radially inside the rotor; and
   the differential lock mechanism is located at a posit on remote from the differential mechanism in an axial direction.

2. The drive system according to claim 1, wherein
   said plurality of gear positions of the transmission mechanism include a direct-drive gear position that is established by coupling the first element to the output member without involving any of the change gear trains, and an overdrive gear position that has a smaller gear ratio than that of the direct-drive gear position; and
   a shift control device is configured to control the transmission mechanism so as to shift the transmission mechanism from the overdrive gear position to the direct-drive gear position when a vehicle speed becomes equal to or higher than a specified value while the overdrive gear position is established.

3. The drive system according to claim 1, wherein
   the transmission mechanism includes a first driveshaft that rotates with the first element, a hollow second driveshaft that is disposed coaxially around the first driveshaft and rotates with the third element, and a countershaft that is disposed in parallel with the first driveshaft and the second driveshaft, and is provided with a counter gear for transmitting power to the output member; and
   one of the first and second change gear trains that provides one of said plurality of gear positions having the largest gear ratio is provided between the first driveshaft and the countershaft.

4. The drive system according to claim 1, wherein
   the transmission mechanism includes a first driveshaft that rotates with the first element, a hollow second driveshaft that is disposed coaxially around the first driveshaft and rotates with the third element, countershafts that are disposed in parallel with the first driveshaft and are provided with counter gears for transmitting power to the output member, and clutches that are disposed radially outwardly of the second driveshaft and selectively couples the change gear trains that provide said plurality of gear positions, to the countershafts; and
   the differential lock mechanism places the differential mechanism in the locked state by coupling the first driveshaft and the second driveshaft to each other, and is disposed between the first driveshaft and one of the clutches.

5. The drive system according to claim 1, wherein
   the transmission mechanism includes a driveshaft to which power is transmitted from the differential mechanism, and a first countershaft and a second countershaft that are disposed in parallel with the driveshaft and transmit power of the driveshaft to the output member; and
   the first change gear train is provided between the driveshaft and the second countershaft for establishing a gear position having the smallest gear ratio, and the second change gear train is provided between the driveshaft and the first countershaft for establishing a gear position having a gear ratio that is larger by two steps than that of the first change gear train are aligned with each other in a direction perpendicular to the axial direction of the driveshaft.

6. The drive system according to claim 5, wherein
   the transmission mechanism includes a change gear train that is disposed between the driveshaft and the first countershaft and provides a gear position having the second largest gear ratio.

7. The drive system according to claim 5, wherein
   the transmission mechanism includes a change gear train that is disposed between the driveshaft and the first countershaft and provides a gear position having the second largest gear ratio.

8. The drive system according to claim 1, wherein
   one of said plurality of gear positions of the transmission mechanism having the smallest gear ratio is a direct-drive gear position established by coupling the first element to the output member without involving any of the change gear trains;
   the transmission mechanism includes a driveshaft to which power is transmitted from the differential mechanism, and a first countershaft and a second countershaft that are disposed in parallel with the driveshaft and transmit power of the driveshaft to the output member; and
   the transmission mechanism includes a change gear train having the largest gear ratio and disposed between the driveshaft and the first countershaft, and a change gear train that is disposed between the driveshaft and the second countershaft and provides a reverse-drive gear position, said change gear trains being aligned with each other in a direction perpendicular to the axial direction of the driveshaft.

9. The drive system according to claim 8, wherein
   the transmission mechanism includes a change gear train that is disposed between the driveshaft and the second countershaft and provides a gear position having a gear ratio that is larger by one step than that of the direct-drive gear position, and a second change gear train that is disposed between the driveshaft and the first countershaft and provides a gear position having a gear ratio that is larger by two steps than that of the change gear train, said change gear trains being aligned with each other in a direction perpendicular to the axial direction of the driveshaft.

10. The drive system according to claim 9, wherein the transmission mechanism includes a change gear train that is disposed between the driveshaft and the first countershaft and provides a gear position having the second largest gear ratio.

11. The drive system according to claim 1, wherein the transmission mechanism includes a driveshaft to which power is transmitted from the differential mechanism, and a countershaft that is disposed in parallel with the driveshaft and transmit power of the driveshaft to the output member; and one of the first and second change gear trains is disposed between the driveshaft and the countershaft and provides a gear position having the largest gear ratio and is located at a position remotest from the internal combustion engine.

12. The drive system according to claim 1, wherein the transmission mechanism includes a driveshaft to which power is transmitted from the differential mechanism, and a first countershaft and a second countershaft that are disposed in parallel with the driveshaft and transmit power of the driveshaft to the output member; and a change gear train that includes the largest gear ratio is provided between the driveshaft and the first countershaft, and a change gear train that provides a reverse-drive gear position is provided between the driveshaft and the second countershaft, such that the change gear trains are positioned so as to be aligned with each other in a direction perpendicular to the axial direction of the driveshaft.

13. The drive system according to claim 1, wherein the transmission mechanism includes a driveshaft to which power is transmitted from the differential mechanism, and a first countershaft and a second countershaft which are disposed in parallel with the driveshaft and transmit power of the driveshaft to the output member; and the change gear trains that provide different gear positions include at least one pair of change gear trains that provide different gear positions, each of said at least one pair of change gear trains being aligned with each other in a direction perpendicular to the axial direction of the driveshaft, such that one of each said pair of change gear trains is disposed between the driveshaft and the first countershaft, and the other of each said pair of change gear trains is disposed between the driveshaft and the second countershaft.

* * * * *